US012493880B2

(12) United States Patent
Derin et al.

(10) Patent No.: US 12,493,880 B2
(45) Date of Patent: Dec. 9, 2025

(54) LOCATION-BASED DIGITAL TRANSACTIONS USING EXTENDED REALITY (XR) ENVIRONMENT

(71) Applicant: HERE Global B.V., Eindhoven (NL)

(72) Inventors: Onur Derin, Eindhoven (NL); Oleksandr Kondrashov, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 218 days.

(21) Appl. No.: 18/212,476

(22) Filed: Jun. 21, 2023

(65) Prior Publication Data

US 2024/0428250 A1    Dec. 26, 2024

(51) Int. Cl.
*G06Q 20/40* (2012.01)
*G06T 19/00* (2011.01)

(52) U.S. Cl.
CPC ..... *G06Q 20/40155* (2020.05); *G06T 19/006* (2013.01); *G06Q 2220/00* (2013.01)

(58) Field of Classification Search
CPC .......... G06Q 20/40155; G06Q 2220/00; G06T 19/006
See application file for complete search history.

(56) References Cited

U.S. PATENT DOCUMENTS

| 11,040,276 | B2 | 6/2021 | Fuchs |
| 11,044,393 | B1 | 6/2021 | Suiter et al. |
| 2020/0193717 | A1 | 6/2020 | Daly |
| 2020/0279392 | A1 | 9/2020 | Shamir et al. |
| 2021/0192505 | A1 | 6/2021 | Xu |
| 2021/0271879 | A1 | 9/2021 | Brown et al. |
| 2021/0279695 | A1 | 9/2021 | Rice |
| 2021/0374978 | A1 | 12/2021 | Döring et al. |
| 2022/0393873 | A1 | 12/2022 | Holland et al. |
| 2023/0154058 | A1* | 5/2023 | Louie ..................... G06V 40/28 345/633 |

(Continued)

FOREIGN PATENT DOCUMENTS

WO    2022243382 A1    11/2022

OTHER PUBLICATIONS

Figueroa et al., "An attribute-based access control using chaincode in RFID systems", 2019, 5 pages.

(Continued)

*Primary Examiner* — Scott S Trotter
(74) *Attorney, Agent, or Firm* — Jeffrey R. Moisan; HERE GLOBAL B.V.

(57) ABSTRACT

A method is provided for facilitating location-based digital transaction. The method may include scanning, using at least one sensor of a host device, a physical environment associated with a digital transaction location. The method may further include generating a set of host anchors based on the scanning of the physical environment. The method may further include computing a host anchor set geometry based on the set of host anchors. The method may further include determining an environment-embedded code associated with the computed host anchor set geometry and the digital transaction location. Further, the environment-embedded code may be stored. The stored environment-embedded code may be provided for facilitation of the digital transaction.

20 Claims, 13 Drawing Sheets

(56) References Cited

U.S. PATENT DOCUMENTS

2023/0154110 A1    5/2023   Stout et al.

OTHER PUBLICATIONS

Lynen et al., "Get Out of My Lab: Large-scale, Real-Time Visual-Inertial Localization", Jul. 2015, 10 pages.
Chen et al., "A survey on deep learning for localization and mapping: Towards the age of spatial machine Intelligence", Jun. 29, 2020, 26 pages.
"Dive into the world of augmented reality.", Apple Inc., retrieved on Jun. 21, 2023 from https://developer.apple.com/augmented reality/, 4 pages.
"Make the world your canvas", Google I/O, retrieved on Jun. 21, 2023 from https://developers.google.com/ar, 11 pages.
Office Action for related European Application No. 24183331.8-1218, dated Oct. 30, 2024, 8 pages.

* cited by examiner

LOCATION-BASED DIGITAL TRANSACTIONS USING EXTENDED REALITY (XR) ENVIRONMENT

BACKGROUND

Typically, various applications require verification of a user's presence at a specific location at a specific time period. For example, in the hospitality industry, the verification of an identity and presence of a user may be required to provide access to a digital locker. Further, access to the digital locker may be provided to the verified user for a certain time period. In another example, in the case of delivery services, a delivery executive may need to verify the identity and an address of the user, before delivering a shipment. In such cases, the user may need to be present at the location to receive the shipment. In many circumstances, a device location of a device associated with a user serves as a proxy for a user location.

Similarly, in a semi-/autonomous mobile device context, verification of the presence of the mobile device at a specific location at a specific time period may be required to enable further applications, such as accessing a restricted area, completing a pick-up/delivery task. In addition, verified presence of a device may be required to trigger execution of code or instructions to initiate, advance or complete a task.

Conventionally, the verification of presence of the device or user associated with the device at a certain location may be performed by use of physical media, such as devices or objects implementing or scanning barcodes and quick response (QR) codes, near field communication (NFC) devices, beacons and cameras. For example, the user may be required to scan the barcode or the QR code using devices, such as smartphones to verify their location. Typically, devices such as smartphones include navigational system capabilities, such as global navigation satellite system (GNSS) capabilities that may be utilized for the verification of the location of the device or user associated with the device.

However, usage of such physical media has its limitations. For example, implementation of the physical media may require infrastructural support as the physical media needs to be physically installed at desired locations. Further, the physical media may be difficult to maintain as the physical media may deteriorate with time due to weather conditions or may be vandalized thereby making them non-functional. Furthermore, the barcodes or the QR codes that may be intended for one-time usage may need to be redeployed after a limited time period, and that may be an expensive and cumbersome task. Another disadvantage associated with physical media may be lack of security as the barcodes and QR codes are visible to anyone. Moreover, the NFC devices or cards may be lost or stolen, and the GNSS readings of the devices may be spoofed. Another disadvantage associated with physical media may be lack of privacy as the location of the user may be constantly monitored and recorded. Also, installed cameras may collect more data (such as images) of the user than actually required for the location verification. Furthermore, data records of the users may be stored with service providers without the consent of the users.

Therefore, there is a need for a secure, reliable and effective system and method to verify the location of devices or users of the device.

SOME EXAMPLE EMBODIMENTS

According to one embodiment, a system, a method and a computer program product for facilitating a digital transaction are provided. The method includes scanning, using at least one sensor of a host device, a physical environment associated with a digital transaction location. The method further includes generating a set of host anchors based on the scanning of the physical environment. The method further includes computing a host anchor set geometry based on the set of host anchors. The method further includes determining an environment-embedded code associated with the computed host anchor set geometry and the digital transaction location. The method further includes storing the environment-embedded code. The stored environment-embedded code is provided for facilitation of the digital transaction.

According to another embodiment, a system is provided. The system comprises at least one processor, and at least one memory including computer program code for one or more computer programs, the at least one memory and the computer program code configured to, with the at least one processor, cause, at least in part, the system to receive a query associated with availability of an environment-embedded code at a digital transaction location of a scanned physical environment, from a resolver device present at the digital transaction location. The system is further caused to provide a set of code information of the environment-embedded code to the resolver device based on the received query. The resolver device is authenticated to receive the set of code information. The system is further caused to receive a resolver anchor set geometry from the resolver device. The resolver anchor set geometry is computed based on the set of code information of the environment-embedded code. The system is further caused to generate a verification result associated with verification of the environment-embedded code based on computation of a similarity of a host anchor set geometry and the resolver anchor set geometry. A set of host anchors are generated by a host device present at the digital transaction location at a prior time instance than a presence of the resolver device at the digital transaction location. The system is further caused to provide for initiation of the digital transaction between the host device and the resolver device based on the generated verification result.

According to another embodiment, a computer program product is provided. The computer program product for facilitating a digital transaction comprises at least one non-transitory computer-readable storage medium having computer-executable program code instructions stored therein. The computer-executable program code instructions are configured to obtain, from a location validation service, an environment-embedded code corresponding to a digital transaction location. The computer-executable program code instructions are further configured to scan, using a sensor of a device, a physical environment at the digital transaction location where the device is present. The computer-executable program code instructions are further configured to generate a set of resolver anchors in an extended reality (XR) environment based on the environment-embedded code. The computer-executable program code instructions are further configured to compute a resolver anchor set geometry based on the set of resolver anchors. The computer-executable program code instructions are further configured to provide, to the location validation service, the resolver anchor set geometry to authorize the initiation of the digital transaction.

In addition, for various example embodiments described herein, the following is applicable: a computer program product may be provided. For example, a computer program product comprising instructions which, when executed by a computer, cause the computer to perform any one or any combination of methods (or processes) disclosed herein.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for conducting the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a system and a method for facilitating a digital transaction between a host device and a resolver device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
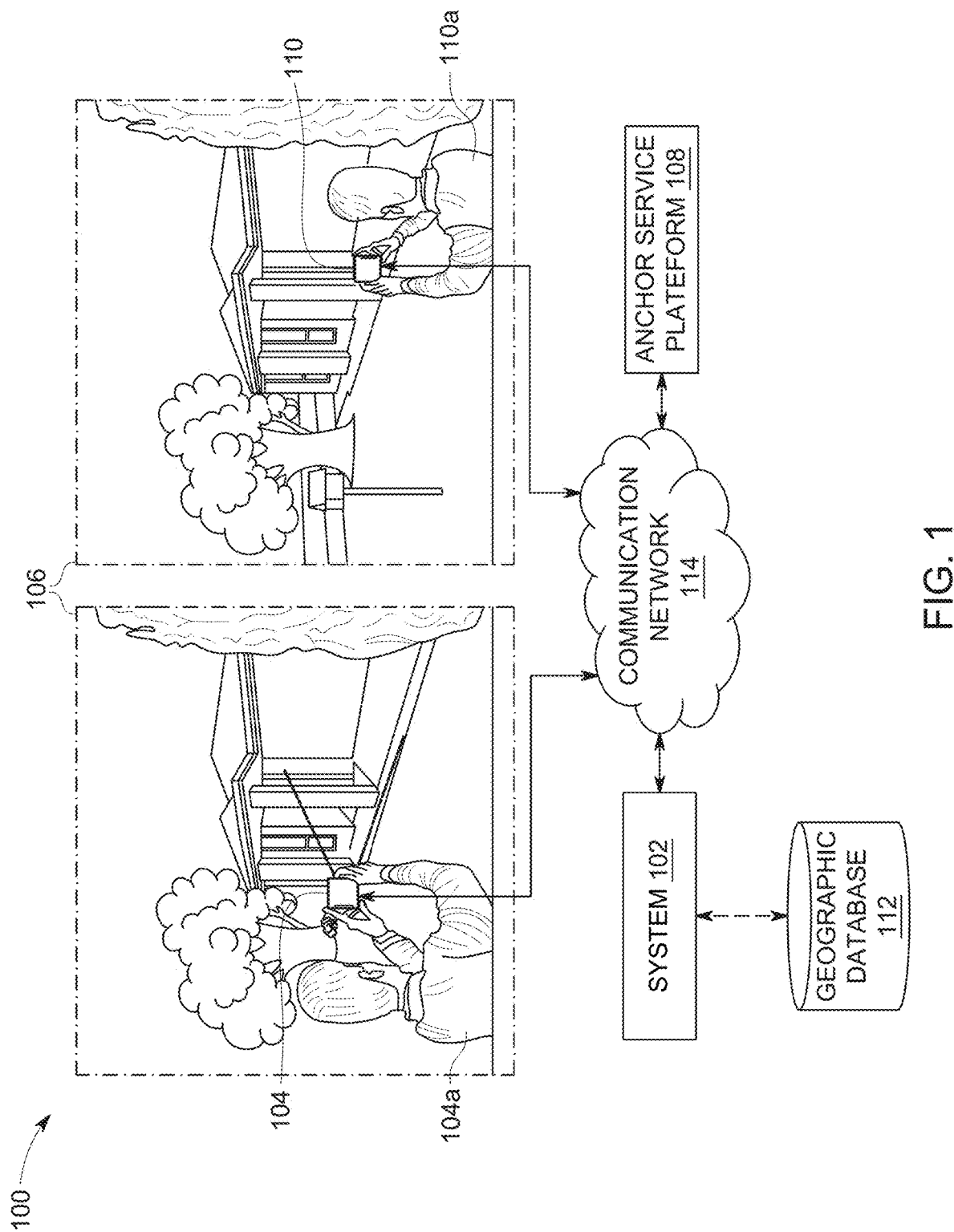
FIG. 1 is a schematic diagram of an environment that shows the different components for facilitating a digital transaction between a host device and a resolver device, according to one embodiment.

FIG. 1 is a schematic diagram of a network environment 100 that shows the different components involved in facilitating a digital transaction between a host device 104 and a resolver device 110 according to one embodiment. The network environment 100 may include a system 102. The network environment 100 may further include the host device 104. The host device 104 may be associated with a first user 104a in a physical environment 106. The network environment 100 may further include an anchor service platform 108. Further, the physical environment 106 may further include the resolver device 110. The resolver device 110 may be associated with a second user 110*a*. The system 102 may be implemented as part of a blockchain. Moreover, the system 102 may be associated with a geographic database 112. The system 102, the host device 104, the anchor service platform 108, and the resolver device 110 may be communicatively coupled using a communication network 114.

Typically, a location of a device may need to be verified for various applications. Conventionally, the location may be verified by use of physical media, such as devices or objects implementing or scanning barcodes and quick response (QR) codes, near field communication (NFC) devices, beacons and cameras. However, there may be certain limitations to the use of such physical media. For example, the physical media may require infrastructural support and may be difficult to maintain. Moreover, the physical media may be intended for one-time usage and deployment of the physical media may be an expensive and a cumbersome task. Further, the usage of the physical media may lack security and privacy of the users may be hampered. Furthermore, the physical media may be lost, stolen or vandalized, thereby making its usage ineffective.

The present disclosure provides the system 102 for facilitating conducting of digital transactions between various devices to verify the location of the users to overcome the problems described above. The system 102 utilizes an extended reality (XR) environment for conducting a digital transaction. The system 102 may be utilized in various applications, such as the hospitality industry, for vehicle parking, delivery services, advertisements, services that require records of visited locations, and so forth. Similarly, the system 102 may be utilized in a semi-/autonomous mobile device context. Verification of the presence of the mobile device at a specific location at a specific time period may be required to enable further applications, such as accessing a restricted area, completing a pick-up/delivery task. The applications may include some embodiments, the system 102 may be utilized by a first party that may be an individual (e.g., the first user 104*a*) that needs to verify the location of another party (e.g., the second user 110*a*). In another embodiment, the system 102 may be utilized by a first party that may be a service provider, an organization or an industry that needs to verify the location of another party (e.g., the second user 110*a*). In many circumstances, a device location of a device associated with a user serves as a proxy for a user location. The system 102 may enable generation of digital means, such as anchors in the XR environment, based on the physical environment 106. The system 102 enables verification of the location of the devices (such as the second device 110) by performing the location-based digital transaction using the digital means. As the system 102 enables verification of the location of the devices by use of digital means, the system 102 eliminates the usage of the physical means, such as the objects implementing barcodes, QR codes, cameras, and such physical verification infrastructure. Thus, the system 102 may overcome the challenges associated with provision of some physical means, such as infrastructure cost, difficulty in maintenance, and chances of the physical means getting lost, stolen or vandalized. Furthermore, the system 102 may perform the digital transaction on a distributed tamper-proof platform, such as a blockchain based platform, thereby making the digital transaction secure, and mitigating problems of lack of security and privacy for the users. Moreover, the system 102 may enable the location-based digital transaction between the two parties, when both the parties may not be present at the location at a same time. Thus, the system 102 may provide ease of access to the users. Hence, the system 102 of the present disclosure may be able to provide an effective and reliable solution to verify the location of the devices or users associated with the devices in a digital manner.

In operation, the system 102 may be utilized by the first user 104*a* and the second user 110*a* for verification of the location (such as the physical environment 106) of the device location of the second user 110*a* or the second user 110*a*. For verification of the location of the second user 110*a*, the first user 104*a* may utilize the system 102 as a host, and the second user 110*a* may utilize the system 102 as a resolver. In an exemplary scenario, the first user 104*a* may be a resident at the physical environment 106. The first user 104*a* may utilize the system 102 for various applications (such as courier services) where other users (such as the second user 110*a*) need to be present at the physical environment 106.

In some embodiments, an application associated with a location validation service may be installed by the first user 104*a* on the host device 104. The location validation service may be, for example, an online service that may be provided by the system 102, for the location based digital transactions. The application may be accessed by the first user 104*a* using the host device 104. The first user 104*a* may be present at the physical environment 106 at a first time instance. The physical environment 106 may be scanned by the first user 104*a* using the application and at least one sensor, such as a camera or LiDAR sensor of the host device 104. The host device 104 may render an XR environment corresponding to the scanned physical environment 106 using the application. By using first scan data associated with the scanned physical environment 106 and a user input received from the first user 104*a*, the system 102 may generate a set of host anchors in the XR environment and further compute a host anchor set geometry for the set of host anchors. Alternatively, the host device 104 may generate a set of host anchors from the first scan data automatically, without requiring rendering of the XR environment. In such case, the anchors of the set may be placed at different locations within the XR environment, based on a random function, a minimum distance between anchors, a pre-defined anchor pattern, or the like. Furthermore, the computed host anchor set geometry of the set of host anchors may be utilized by the system 102 to determine an environment-embedded code. The environment-embedded code may be a unique code corresponding to the generated set of host anchors. Details of the operations of the host device 104 with the system 102 are further provided, for example, in FIG. 3.

Furthermore, the second user 110*a* may be present at the physical environment 106 at a second time instance, such as a time instance that is later than the first time instance. In an example, the second user 110*a* may be associated with a courier service provider. For example, the first user 104*a* is absent from the physical environment 106 at the second time instance, and the second user 110*a* is unable to deliver the courier to a digital transaction location of the first user 104*a* in the physical environment 106. In such a case, the system 102 may be utilized by the second user 110*a* to provide a proof to the first user 104*a* that the delivery was indeed attempted, however the delivery was unsuccessful. A record of the proof of location of the second user 110*a* may be sent to the courier service provider, and if requested by the first user 104*a*, the courier service provider may share the record of the proof of location of the second user 110*a* with the first user 104a. In some cases, the second user 110a may directly be able to send the record of the proof of location to the first user 104a.

In order to provide the proof of location, the second user 110a may utilize the system 102. Once the resolver device 110 (such as a smartphone) associated with the second user 110a may be present at the physical environment 106 at a second time instance, the resolver device 110 may send a query associated with availability of the environment-embedded code at the digital transaction location of the scanned physical environment 106 to the system 102. Based on the received query, the system 102 may provide a set of code information of the environment-embedded code to the resolver device 110. In some embodiments, the resolver device 110 may be authorized to receive the set of code information based on a smart contract between the first user 104a and users (such as the second user 110a) of the courier service provider. In an embodiment, the smart contract may be executed between the first user 104a and the users (such as the second user 110a) of the courier service provider on the system 102.

Based on reception of the set of code information, the XR environment may be hosted or executed on the resolver device 110. The second user 110a may access the application associated with the location validation service using the resolver device 110 (such as a smartphone) associated with the second user 110a. The physical environment 106 may be scanned by the second user 110a using the application and at least one sensor, such as a camera of the resolver device 110 to generate second scan data. The resolver device 110 may render the XR environment corresponding to the scanned physical environment 106 using the application.

The resolver device 110 may generate a set of resolver anchors based on the received set of code information, and the second scan data and may further compute a resolver anchor set geometry of the set of resolver anchors. The system 102 may further compute a similarity of the host anchor set geometry and the resolver anchor set geometry, to generate a verification result associated with verification of the environment-embedded code. Based on the computed similarity, the verification result may indicate a successful verification or an unsuccessful verification of the environment-embedded code. In case the verification result indicates the successful verification, the location of the second user 110a at the physical environment 106 at the second time instance may be verified. In some embodiments, a proof-of-location (POL) certificate may further be issued by the system 102 to the second user 110a as the record of the proof of location. Thus, the location of the second user 110a may be verified by use of the system 102 without use of any physical media. Details of the operation of the resolver device 110 with the system 102 are further provided, for example, in FIG. 4.

Figure 2A:
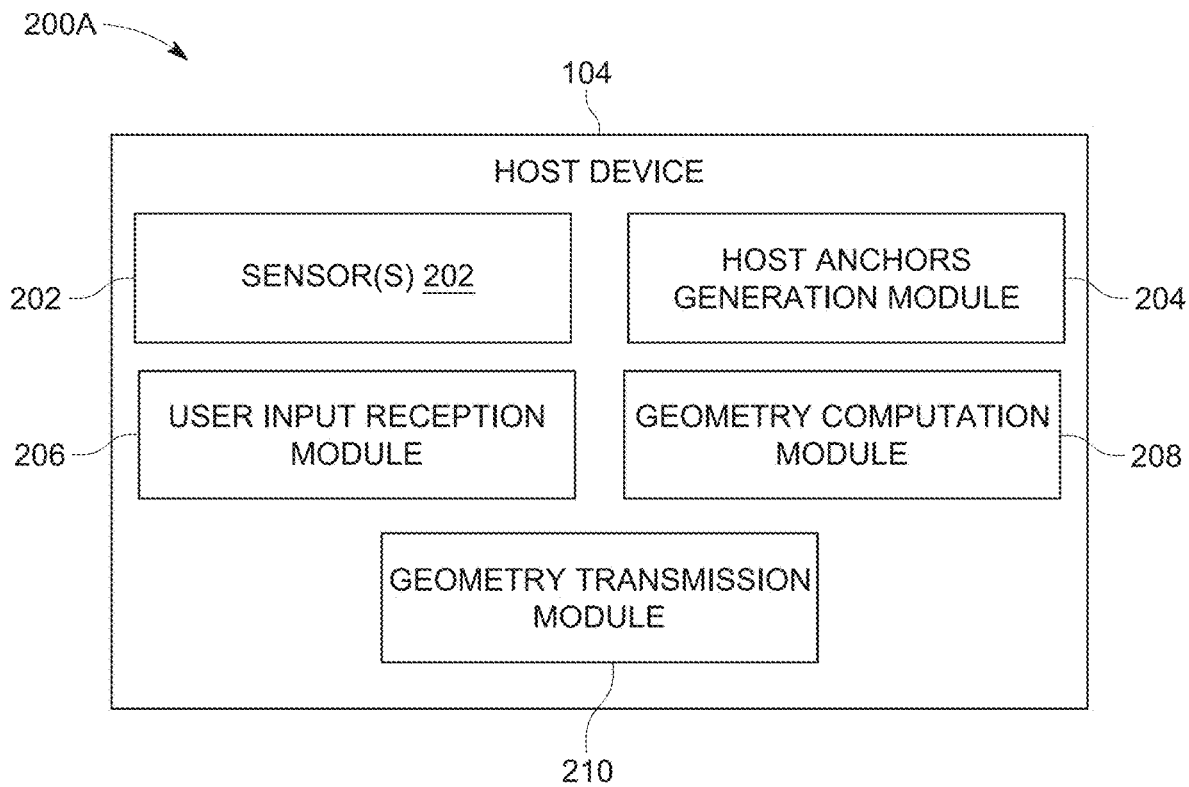
FIG. 2A is a diagram of components of the host device capable of executing a method for facilitating the digital transaction, according to one embodiment.
Figure 2B:
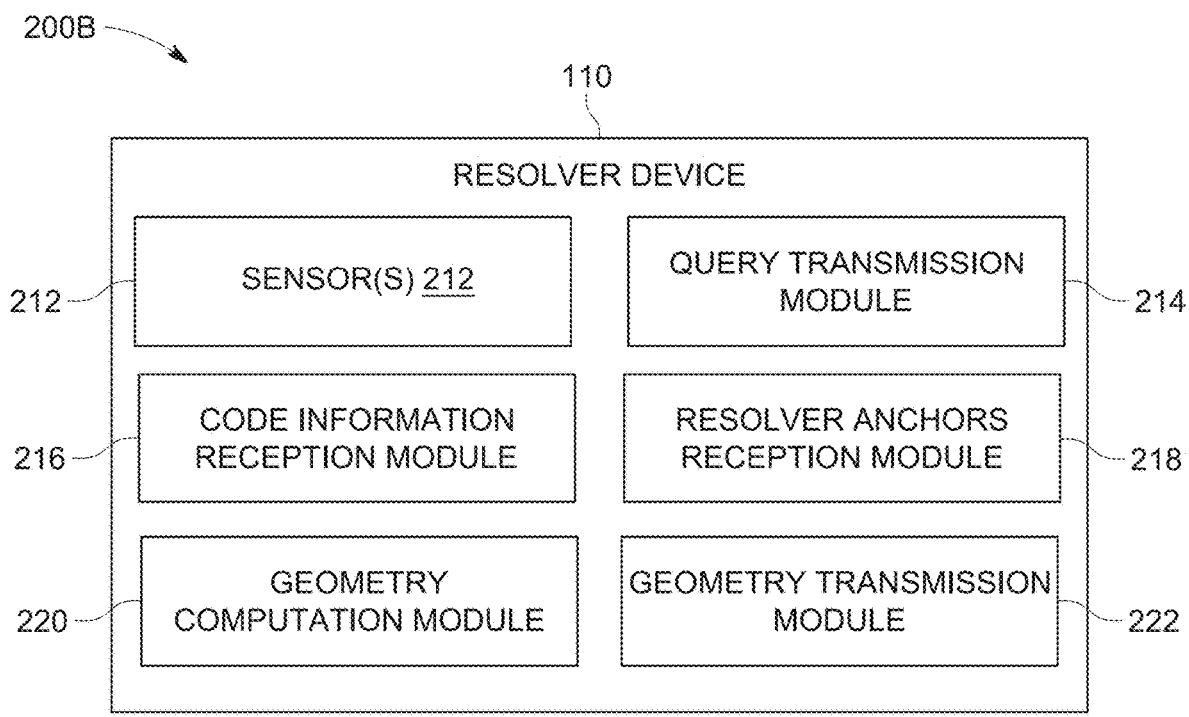
FIG. 2B is a diagram of components of the resolver device capable of executing a method for facilitating the digital transaction, according to one embodiment.
Figure 2C:
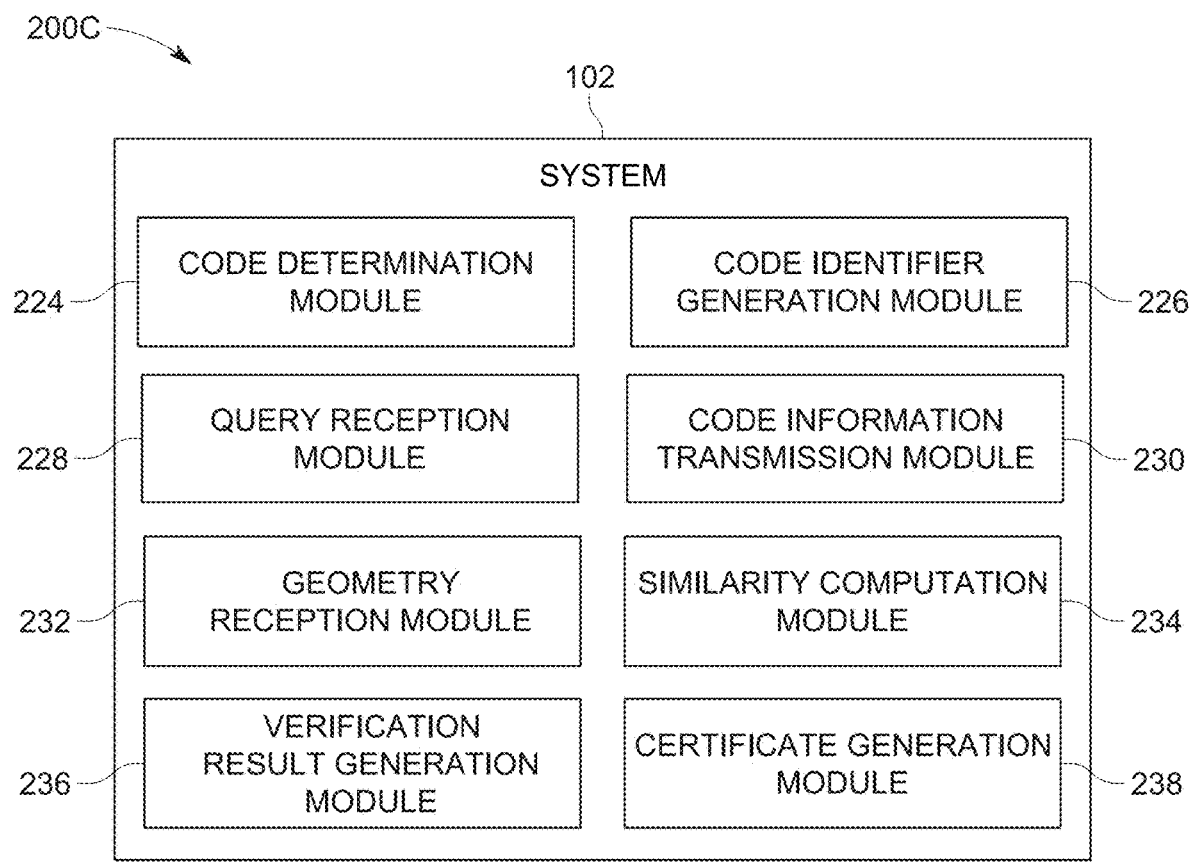
FIG. 2C is a diagram of components of a system capable of executing a method for facilitating the digital transaction between the host device and the resolver device, according to one embodiment.

The components of the host device 104, the resolver device 110, and the system 102 for facilitating the digital transaction at the scanned physical environment 106 are described in FIG. 2A, FIG. 2B, and FIG. 2C respectively.

FIG. 2A is a diagram 200A of components of the host device 104 capable of executing a method for facilitating the digital transaction, according to one embodiment. In one embodiment, as shown in FIG. 2A, the host device 104 of the diagram 200A includes one or more components for facilitating the digital transaction according to the various embodiments described herein. It is contemplated that the functions of the components of the host device 104 may be combined or performed by other components of equivalent functionality. As shown, in one embodiment, the host device 104 includes at least one sensor 202, a host anchors generation module 204, user input reception module 206, a geometry computation module 208, and a geometry transmission module 210.

The at least one sensor 202 of the host device 104 may be configured to scan the physical environment 106. For example, the at least one sensor 202 may be a camera or any image capturing device associated with the host device 104, the at least one sensor 202 may be a LiDAR sensor or any spatial point-cloud capturing sensor associated with the host device 104. In some embodiments, camera, LiDAR or similar sensors may work in tandem to scan the physical environment 106. The host anchors generation module 204 may be configured to generate the set of host anchors based on the scanning of the physical environment 106 and reception of a user input. The user input reception module 206 may be configured to receive the user input from the first user 104a. The user input may correspond to, for example, a placement of the set of host anchors in the XR environment. In some embodiments, the host device 104 may generate a set of host anchors from the first scan data automatically, without requiring rendering of the XR environment or a user placement of host anchors. The geometry computation module 208 may be configured to compute the host anchor set geometry. The geometry transmission module 210 may be configured to transmit the computed host anchor set geometry to the system 102.

The above presented modules and components of the host device 104 can be implemented in hardware, firmware, software, or a combination thereof. In another embodiment, one or more of the modules 202-210 may be implemented as a cloud-based service, local service, native application, or combination thereof. The functions of the host device 104 and modules 202-210 are discussed with respect to, for example, FIG. 3.

FIG. 2B is a diagram 200B of components of the resolver device 110 capable of executing a method for facilitating the digital transaction, according to one embodiment. In one embodiment, as shown in FIG. 2B, the resolver device 110 of the diagram 200B includes one or more components for performing the digital transaction according to the various embodiments described herein. It is contemplated that the functions of the components of the resolver device 110 may be combined or performed by other components of equivalent functionality. As shown, in one embodiment, the resolver device 110 includes at least one sensor 212, a query transmission module 214, a code information reception module 216, a resolver anchors reception module 218, a geometry computation module 220, and a geometry transmission module 222.

In an embodiment, the at least one sensor 212 of the resolver device 110 may be configured to scan the physical environment 106. For example, the at least one sensor 212 may be a camera or any image capturing device associated with the resolver device 110, the at least one sensor 212 may be a LiDAR sensor or any spatial point-cloud capturing sensor associated with the resolver device 110. In some embodiments, camera, LiDAR or similar sensors may work in tandem to scan the physical environment 106. The query transmission module 214 may be configured to transmit a query associated with an unresolved environment-embedded code to the system 102. In response to the query transmitted by the query transmission module 214, the code information reception module 216 may be configured to receive a set of code information of the unresolved environment-embedded code. The set of code information may include information regarding availability of the unresolved environment-embedded code at the scanned physical environment 106. The resolver anchors reception module 218 may be configured to receive a set of resolver anchors based on second scan data of the physical environment 106 and the set of code information. In an embodiment, the resolver anchors reception module 218 may be configured to generate the set of resolver anchors based on the second scan data of the physical environment 106 and the set of code information. The geometry computation module 220 may be configured to compute the resolver anchor set geometry. The geometry transmission module 222 may be configured to transmit the computed resolver anchor set geometry to the system 102.

The above presented modules and components of the resolver device 110 can be implemented in hardware, firmware, software, or a combination thereof. In another embodiment, one or more of the modules 212-222 may be implemented as a cloud-based service, local service, native application, or combination thereof. The functions of the resolver device 104 and modules 212-222 are discussed with respect to, for example, FIG. 4.

FIG. 2C is a diagram 200C of components of the system 102 capable of executing a method for facilitating the digital transaction, according to one embodiment. In one embodiment, as shown in FIG. 2C, the system 102 of the diagram 200C includes one or more components for facilitating the digital transaction according to the various embodiments described herein. It is contemplated that the functions of the components of the system 102 may be combined or performed by other components of equivalent functionality. As shown, in one embodiment, the system 102 includes a code determination module 224, a code identifier generation module 226, a query reception module 228, and a code information transmission module 230, a geometry reception module 232, a similarity computation module 234, a verification result generation module 236, and a certificate generation module 238.

The code determination module 224 of the system 102 may be configured to determine the environment-embedded code associated with the computed host anchor set geometry and the digital transaction location. The code identifier generation module 226 may be configured to generate an environment-embedded code identifier (eeID) for the determined environment-embedded code. The eeID may be utilized by the resolver device 110 for the reception of the set of resolver anchors. The query reception module 228 may be configured to receive the query from the resolver device 110. Based on the received query, the code information transmission module 230 may be configured to transmit the set of code information to the resolver device 110. The geometry reception module 232 may be configured to receive the host anchor set geometry from the host device 104 and the resolver anchor set geometry from the resolver device 110. The similarity computation module 234 may be configured to compute similarity between the received host anchor set geometry and the received resolver anchor set geometry. In an embodiment, the similarity may be computed based on a distance correlation metric. The verification result generation module 236 may be configured to generate a verification result based on the computed similarity. The verification result may indicate a successful verification of the digital transaction location or an unsuccessful verification of the digital transaction location. The certificate generation module 238 may be configured to generate the proof-of-location certificate when the generated verification result indicates the successful verification.

The above presented modules and components of the system 102 can be implemented in hardware, firmware, software, or a combination thereof. Though depicted as a separate entity in FIG. 1, it is contemplated that the system 102 may be implemented as a module of any of the components of the network environment 100 (e.g., a component of the anchor services platform 108 and/or the like). In another embodiment, one or more of the modules 224-238 may be implemented as a cloud-based service, local service, native application, or combination thereof. The functions of the system 102 and modules 224-238 are discussed with respect to, for example, FIG. 3, FIG. 4, FIG. 5 and FIG. 6.

Figure 3:
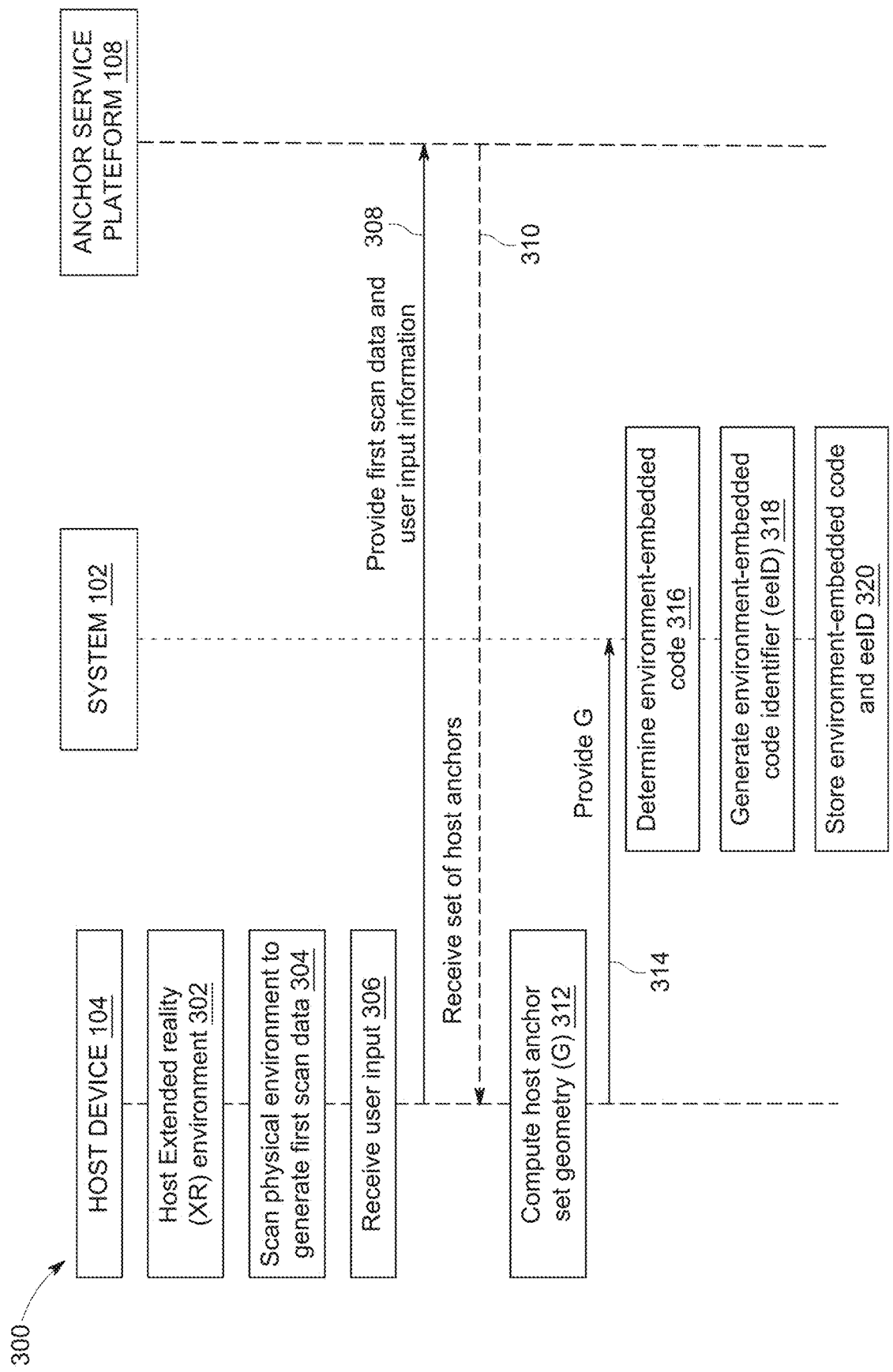
FIG. 3 is a sequential diagram that represents operations of the host device with the system for facilitation of the digital transaction, according to one embodiment.
Figure 8:
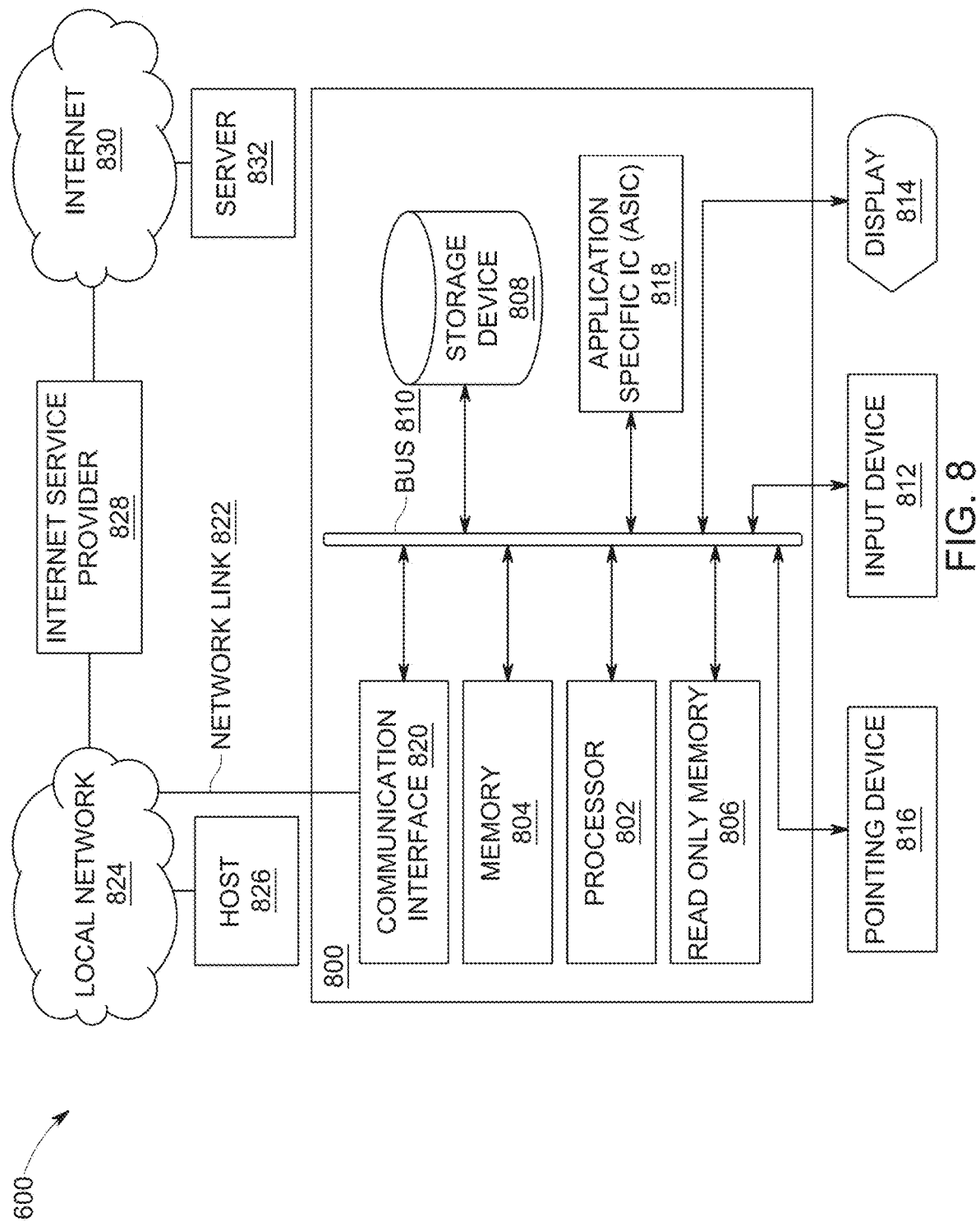
FIG. 8 is a diagram of hardware that can be used to implement an embodiment.
Figure 9:
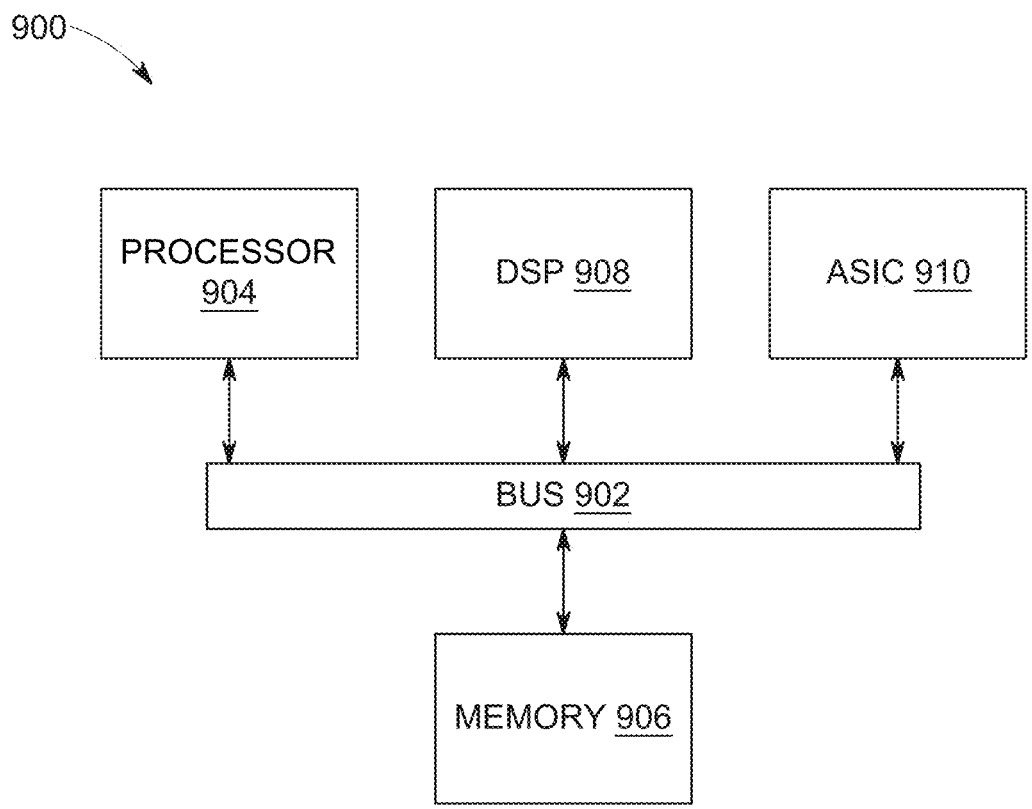
FIG. 9 is a diagram of a chip set that can be used to implement an embodiment.

FIG. 3 is a sequential diagram 300 that represents operations of the host device 104 with the system 102 for facilitation of the digital transaction, according to one embodiment. In various embodiments, the system 102, the host device 104 and/or any of the modules 202-210 may perform one or more portions of the operations and may be implemented in, for instance, a chip set including a processor and a memory as shown in FIG. 8 and FIG. 9. As such, the system 102, the host device 104, any of the modules 202-210 and/or modules 224-238 may provide means for accomplishing various parts of the operations, as well as means for accomplishing embodiments of other processes described herein in conjunction with other components of the system 102. Although the operations are illustrated and described as a sequential flow, it is contemplated that various embodiments of the operations may be performed in any order or combination and need not include all of the illustrated steps of the sequential flow.

In step 302, the XR environment may be hosted. In some embodiments, the host device 104 may be configured to host the XR environment. For example, hosting the XR environment may also refer to running, executing or instantiating the XR environment. For hosting the XR environment, the first user 104a may utilize an application installed on the host device 104. The application may execute the XR environment whenever required by the first user 104a. The application may be related to the location validation service. For example, the location validation service may be provided by a service provider that may provide various services such as verification of the location of the users at a specific time instance. The location validation service may utilize the system 102 for verification of the location. For example, the location validation service may utilize the location-based digital transactions provided by the system 102 to verify the location of the users (such as the second user 110a) or devices (such as the resolver device 110 associated with the users (such as the second user 110a). In an example, the location validation service may be utilized in various application, such as the hospitality industries, for vehicle parking, advertisements, services that require location records, such as security, housekeeping, and the like, delivery services, and for personal usage such as for providing access to messages or objects upon arrival at a location.

The system 102 may be implemented in the blockchain. In an example, the system 102 itself may be the blockchain. In some embodiments, the digital transaction is associated with a location smart contract that may be executed by use of the blockchain. Thus, the system 102 may enable execution of the location smart contract for initiation of the digital transaction. The location smart contract may be defined between different parties, such as the users that may need to utilize the location validation service.

For example, the location smart contract may be defined between a customer of a hotel and a user account associated with the hotel. In an example, the customer may require access to a locker at a location in the hotel, that may be provided by the hotel when the customer is present at the location. In such a case, the first user 104*a* may correspond to the user account associated with the hotel, and the second user 110*a* whose location needs to be verified may correspond to the customer of the hotel. The first user 104*a* i.e., the user account associated with the hotel and the second user 110*a* i.e., the customer may utilize the location validation service for the location verification.

In another example, the location smart contract may be defined between a user account of a security services, and employees such as security guards employed with the security services. The security guards may need to provide proof of the location they visit during working hours. In such a case, the user account of the security services may be the first user 104*a* and the security guards may be multiple users (such as the second user 110*a*) whose locations may be verified using the system 102.

As the system 102 may be implemented in the blockchain for secure and reliable digital transactions, the system 102 may execute the location smart contract on the blockchain to provide authentication to the users (such as the second user 110*a*) associated with the resolver device 110 to receive information for successful verification of their location. For example, the location smart contract may include self-executing programs that may be stored on the blockchain that run when predetermined conditions are met. For example, the predetermined conditions may include terms of an agreement between the first user 104*a* and the second user 110*a*. Notably, the location smart contract may be immutable, and may provide transparency and security for the digital transactions.

In an exemplary scenario, the first user 104*a* may be a resident at the location in the physical environment 106. The first user 104*a* may utilize the location validation service and the system 102 for courier services. The first user 104*a* may need a proof of attempted delivery by the delivery executive in case the first user 104*a* is not present at the location when the delivery is attempted. In order to utilize the system 102, the application associated with the location validation service may be installed on the host device 104 by the first user 104*a*. The first user 104*a* may visit the physical environment 106 at the first time instance. The application may be opened on the host device 104 by the first user 104*a*. The application may host or execute the XR environment using the application.

In step 304, the physical environment 106 associated with the digital transaction location may be scanned. The host device 104 may be utilized by the first user 104*a* to scan the physical environment 106 to generate first scan data. For example, the host device 104 may utilize the at least one sensor 202 (such as camera of the smartphone) and the application to scan the physical environment 106. The host device 104 may be moved in the physical environment 106 by the first user 104*a* to scan the physical environment 106 using the camera/LiDAR sensor. The hosted XR environment may be updated based on the scanned physical environment 106. In an example, the hosted XR environment may correspond to the scanned physical environment 106 and may include visual features of the scanned physical environment 106.

The first user 104*a* may select a region or positions in the physical environment 106 corresponding to which the set of host anchors may be placed in the XR environment. The first user 104*a* may select the region by pointing the host device 104 in a direction indicating the region. For example, the region may include a front door of a house of the first user 104*a* in the physical environment 106. Based on the scanning of the physical environment 106, the first scan data may be generated. For example, the at least one sensor (e.g., cameras, LiDAR) may capture the visual features, such as physical objects in the physical environment 106, for example, the front door, trees, buildings, roads, and features such as amount of brightness, and the like. The first scan data may further include information related to the location of the physical environment 106, such as geographical coordinates (e.g., global positioning system (GPS) co-ordinates) of the location, postal address acquired by the host device 104, and the like.

In step 306, user input may be received. The user input may be received from the first user 104*a* via the host device 104. In some embodiments, the user input reception module 206 may be configured to receive the user input. The user input may correspond to the positions in the XR environment where the set of host anchors may be generated. For example, the first user 104*a* may provide the user input to the host device 104 using various methods, such as by direct touch input through a display of the host device 104 or an audio input. The user input may include a command or request for generating the set of host anchors at the positions indicated by the user input.

In an example, the host device 104 may receive a first touch input at a first position in the XR environment for generation of a first host anchor of the set of host anchors. The host device 104 may further receive a second touch input at a second position in the XR environment for generation of a second host anchor of the set of host anchors. Similarly, the host device 104 may further receive a third touch input at a third position in the XR environment for generation of a third host anchor of the set of host anchors. A number of the host anchors in the set of host anchors, and a distance between the host anchors may be defined by the first user 104*a*. In an example, a minimum number of the host anchors in the set of host anchors may be three. Details of the positions of the set of host anchors in the XR environment are further provided, for example, in FIG. 5.

For example, the first user 104*a* may touch on the display of the host device 104 to place a host anchor of the set of host anchors in the hosted XR environment. Further, in one embodiment, the set of host anchors are generated based on multiple inputs received from the first user 104*a* and the scanning of the physical environment 106. In some embodiments, the host anchors generation module 204 may be configured to interface with the anchor services platform 108 to generate the set of host anchors, based on the received inputs from the first user 104*a*. Alternatively, in one or more embodiments, the host anchors generation module 204 may be configured to generate the set of host anchors on the host device 104. The reception of the user input may be performed by the user input reception module 206 of the host device 104. Alternatively, the host device 104 may generate a set of host anchors from the first scan data automatically, without requiring rendering of the XR environment on e.g. a user interface. In such case, the anchors of the set may be placed at different locations within the XR environment, based on a random function, a minimum distance between anchors, a pre-defined anchor pattern, or the like.

In step 308, the set of host anchors may be generated. The host device 104 may be configured to generate the set of host anchors in the XR environment using the first scan data and the user input. The generated set of host anchors may be three-dimensional (3D) virtual objects having unique placements in the XR environment that are generated based on the first scan data and the positions provided as input by the first user 104*a*. Typically, the set of host anchors may be generated based on a 3D understanding of the physical environment 106.

The unique placement of the generated set of host anchors may include a unique orientation and a position of the set of host anchors. The orientation and the position may be determined using a variety of techniques, such as GPS, computer vision, or sensors that may be utilized to track the position and the orientation of the objects in the 3D space of the XR environment and/or physical environment 106. For example, the tracking of the orientation and the position of the set of host anchors may be required for ensuring seamless integration of the set of host anchors with the physical environment 106 in the XR environment.

In some embodiments, the first scan data and information associated with the user input may be provided to the anchor service platform 108. In one or more embodiments, the host device 104 may be configured to transmit the first scan data and information associated with the user input to the anchor service platform 108. The anchor service platform 108 may be associated with a service that may provide anchors or any unique placements for the XR environment based on the 3D understanding of the physical environment 106. In an embodiment, the anchor service platform 108 may be a part of the system 102. The first scan data and the user input data may be transmitted by the host device 104 to the anchor service platform 108 using the communication network 114. The first scan data and the user input may be stored to generate the set of host anchors for future applications, without having to scan the physical environment 106 again.

In step 310, the set of host anchors may be received by the host device 104. The host device 104 may be configured to receive the set of host anchors from the anchor service platform 108 using the communication network 114. In an exemplary scenario, the set of host anchors may be received by the host device 104 in real-time or near real-time. The received set of host anchors may be displayed in the XR environment hosted on the application associated with the location validation service. For example, the set of host anchors may be displayed in the XR environment at the positions provided by the first user 104*a* as the user input.

In step 312, a host anchor set geometry (denoted as "G") may be computed by the host device 104. The host device 104 may be configured to compute the host anchor set geometry based on the set of host anchors received from the anchor service platform 108. The set of host anchors may be processed by, for example, the geometry computation module 208 of the host device 104 to compute the host anchor set geometry. Given the many distinct and quasi-random locations that the different host anchors in a set may exhibit, the resulting geometry can be considered to be unique, e.g. serving as a highly secure one-time passcode.

In some embodiments, the host anchor set geometry may be further computed based on anchor positions of the set of host anchors in the XR environment. For example, the host anchor set geometry may be computed by utilizing the positions of each host anchor of the set of the host anchors. Further, the host anchor set geometry may be computed based on distances between the host anchors of the set of host anchors in the XR environment. In an exemplary scenario, the set of host anchors may include three host anchors. In such a case, the position of each of the three host anchors may be utilized to compute the host anchor set geometry. Moreover, the distance between each of the three host anchors may be utilized to compute the host anchor set geometry. Notably, the placement of the three host anchors in the XR environment may form a single line or a triangle.

In case the placement of the three host anchors in the XR environment forms the triangle, each of the host anchors of the set of host anchors may be considered as a vertex of the formed triangle, and the distance between each vertex may be calculated to compute the host anchor set geometry. In cases where more anchors are used, more complex host anchor set geometries can result, which may increase the uniqueness of the geometry.

In an embodiment, the host anchor set geometry may include information about structural features of the set of host anchors, such as a shape, size, orientation, position and relative distances of the set of host anchors.

The host anchor set geometry may further be computed based on vectors of the set of host anchors in the XR environment. The vectors of the set of host anchors may represent a multidimensional array of numbers that may be utilized to determine the orientation and the position of the set of host anchors in the XR environment. For example, the vectors in the XR environment may represent a transformation matrix that may be a type of typical tensor describing the position, the orientation and a scale of the set host anchors in the XR environment. For example, the vectors may be represented by a 4×4 transformation matrix. However, the specific representation of the vectors may vary depending on the XR environment. In an example, the transformation matrix may be determined from the transform component of the set of host anchors that includes the position, a rotation, and the scale values in form of the 4×4 transformation matrix.

In step 314, the computed host anchor set geometry may be provided to the system 102. In an embodiment, the geometry transmission module 210 of the host device 104 may be configured to transmit the host anchor set geometry to the system 102. The geometry transmission module 210 may transmit the computed host anchor set geometry via the communication network 114. Further, the system 102 may receive the host anchor set geometry and may store the host anchor set geometry in the blockchain. The host anchor set geometry may further be utilized for the facilitation of the digital transaction as described in FIG. 4.

In step 316, an environment-embedded code may be determined. In an embodiment, the code determination module 224 of the system 102 may be configured to determine the environment-embedded code. The environment-embedded code may be associated with the computed host anchor set geometry of the set of host anchors and the digital transaction location of the physical environment 106. The environment-embedded code may be a unique code specific to the host anchor set geometry and the digital transaction location.

In some embodiments, the environment-embedded code may be further based on the host anchor set geometry. For example, the host anchor set geometry may include the information such as the shape, the orientation, and the position of the of the set of host anchors in the XR environment. Further, the environment-embedded code may be based on the geographical coordinates of the digital transaction location. For example, the geographical coordinates of the digital transaction location may include the GPS coordinates of the digital transaction location in the physical environment 106. In some embodiments, the system 102 may be configured to generate a location identifier corresponding to the digital transaction location associated with the physical environment 106. For example, instead of utilizing the geographical coordinates of the location, the system 102 may utilize the location ID corresponding to the location to generate the environment-embedded code. In such a manner, the privacy of the first user 104a may be maintained, as the location of the first user 104a may not be stored with the system 102.

The environment-embedded code may further be based on anchor identifiers (aIDs) of the set of host anchors. For example, each of the host anchors of the set of host anchors may be provided with an anchor identifier (aID) that may be utilized to determine the environment-embedded code. The environment-embedded code may further be based on a timestamp associated with the determined environment-embedded code or authentication information associated with the host device 104. For example, the timestamp may be a time of determination of the environment-embedded code. In an example, the time of determination of the environment-embedded code may be similar to the first time instance at which the first user 104a may be present at the digital transaction location and the set of host anchors may be generated. The authentication information associated with the host device 104 may include, for example, user information associated with the first user 104a and information of the location smart contract between the first user 104a and the second user 110a. The system 102 may thus, determine the environment-embedded code based on for example, the host anchor set geometry, the geographical coordinates of the digital transaction location, the anchor identifiers of the set of host anchors, the timestamp associated with the determined environment-embedded code, authentication information, or the combination thereof.

In some embodiments, the determined environment-embedded code may include a validity time period. For example, the environment-embedded code may remain active or valid for the specific validity time period. The validity time period may be assigned to the environment-embedded code by the first user 104a. The validity time period may be a time period within which the environment-embedded code may be resolved by other users, such as the second user 110a for facilitation of the digital transaction.

For example, the validity time period may be assigned ranging from a few minutes to an hour, a day, a week and/or a month and so forth. Thus, the environment-embedded code may be resolved by the second user 110a only when the second user 110a is present at the digital transaction location within the validity time period. Therefore, the resolution of the environment-embedded code may unsuccessful after the validity time period, as the environment-embedded code may become inactive or expired.

In step 318, an environment-embedded code identifier (eeID) may be generated. In some embodiments, the code identifier generation module 226 of the system 102 may be configured to generate the eeID based on the determined environment-embedded code. For example, the system 102 may generate a unique eeID for the determined environment-embedded code and the eeID of the determined environment-embedded code may be utilized to identify the environment-embedded code and fetch information of the determined environment-embedded code associated with the digital transaction location. In an example, the eeID may be a combination of a unique alpha numeric code associated with the environment-embedded code.

In step 320, the environment-embedded code and the associated eeID may be stored. The system may be configured to store the environment-embedded code and the associated eeID. In an embodiment, the system 102 may be configured to upload the environment-embedded code and the eeID to the blockchain that may be managing the location smart contract. The determined environment-embedded code, along with the corresponding eeID may be stored for carrying out the digital transaction. For example, the system 102 may be configured to store the environment-embedded code in the blockchain to be used later for the facilitation of the digital transaction.

Figure 4:
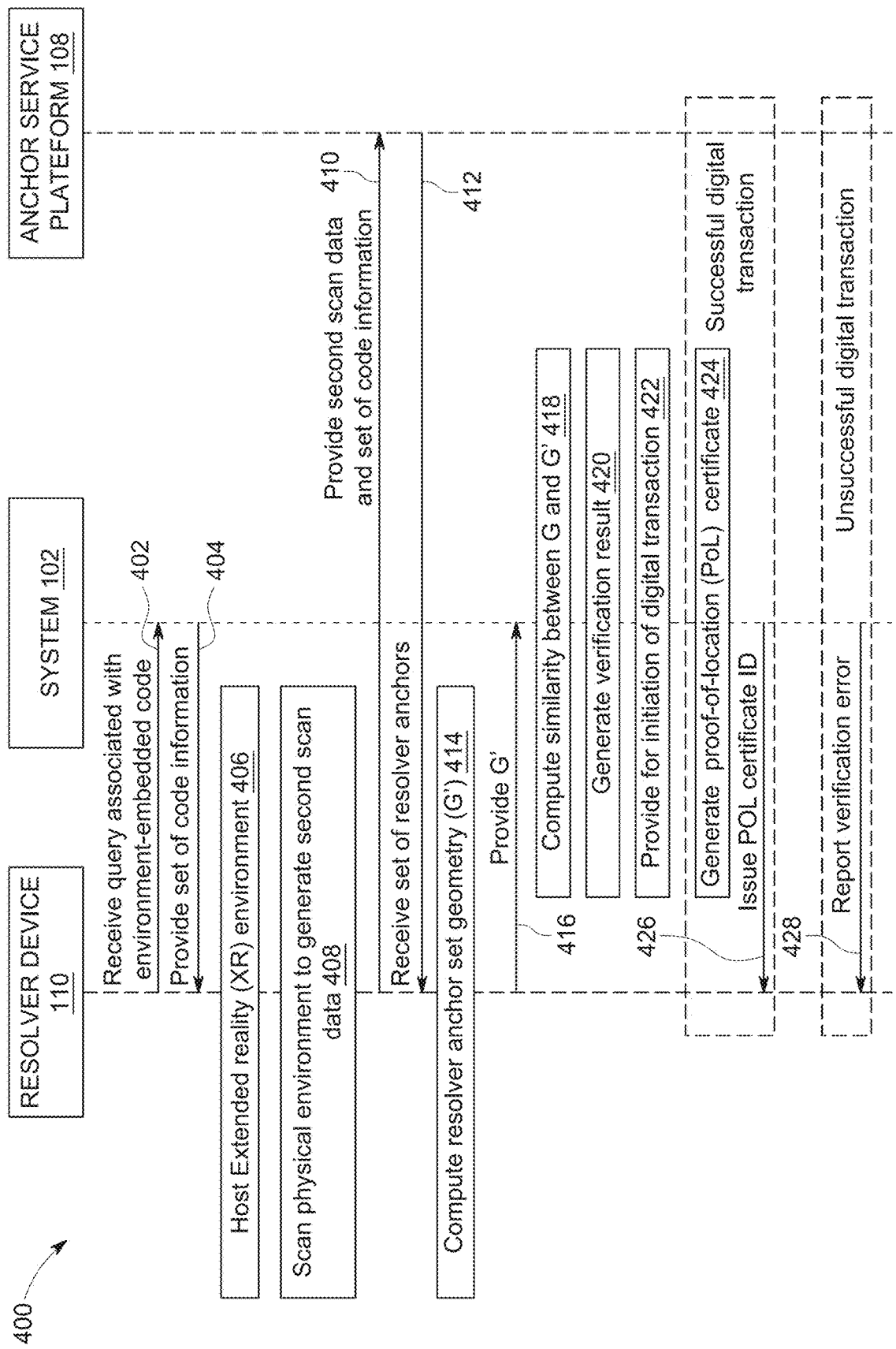
FIG. 4 is a sequential diagram that represents operations of the resolver device with the system for facilitation of the digital transaction, according to one embodiment.

The environment-embedded code may further be utilized to facilitate the digital transaction between the host device 104 and the resolver device 110, further explained in FIG. 4.

FIG. 4 is a sequential diagram 400 that represents operations of the resolver device 110 with the system 102 for facilitation of the digital transaction, according to one embodiment. In various embodiments, the system 102, resolver device 110, any of the modules 212-222 and/or modules 224-238 may perform one or more portions of the operations and may be implemented in, for instance, a chip set including a processor and a memory as shown in FIG. 8 and FIG. 9. As such, the system 102, the resolver device 110, and/or any of the modules 212-222 of the resolver device 110 may provide means for accomplishing various parts of the operations, as well as means for accomplishing embodiments of other processes described herein in conjunction with other components of the network environment 100. Although the operations are illustrated and described as a sequence of steps, it is contemplated that various embodiments of the operations may be performed in any order or combination and need not include all of the illustrated steps.

In step 402, a query may be received. In some embodiments, the system 102 may be configured to receive the query from the resolver device 110. The query may be associated with the environment-embedded code at the digital transaction location of the scanned physical environment 106. The query may be received by the system 102 when the resolver device 110 may be present at or near the digital transaction location at the second time instance that may be a later time instance than the first time instance. For example, the resolver device 110 may be present within a few meters of the digital transaction location. In an embodiment, the query may include information about current geographical coordinates of the resolver device 110. In an embodiment, the query transmission module 214 of the resolver device 110 may be configured to transmit the query that may be received by the query reception module 228 of the system 102 via the communication network 114.

In an example, the query may be automatically transmitted by the resolver device 110 once the resolver device 110 is at or near the digital transaction location. For example, the environment-embedded code may be unresolved initially, i.e., the resolution of the environment-embedded code by the resolver device 110 may be pending.

In step 404, a set of code information may be provided by the system 102 to the resolver device 110. In some embodiments, the code information transmission module 230 of the system 102 may be configured to provide the set of code information to the code information reception module 216 of the resolver device 110. The set of code information may be provided to the resolver device 110 based on the received query.

In an embodiment, the system 102 may authenticate the presence of the resolver device 110 at the digital transaction location to execute the location smart contract associated with the digital transaction. In an example, the set of code information may be received by the resolver device 110 as the resolver device 110 may be authenticated to receive the set of code information. For example, the location smart contract between the first user 104a and the users (such as the second user 110a) of the courier service may specify that devices of the users (such as the resolver device 110 of the second user 110a) may only be authenticated to receive the set of code information corresponding to the environment-embedded code at the digital transaction location. Moreover, the location smart contract may specify that the devices of the users (such as the resolver device 110 of the second user 110a) may only be authenticated to receive the set of code information within the validity time period of the environment-embedded code. In an exemplary scenario, the first user 104a may be expecting to receive the courier within five days of generation of the environment-embedded code. In such a case, the resolver device 110 may only be authenticated to receive the set of code information within the five days of the generation of the environment-embedded code. Thus, at the second time instance, the resolver device 110 may be authenticated to receive the set of code information from the system 102. Based on the successful authentication, the location smart contract may be executed.

In some embodiments, the set of code information may include the eeID associated with the environment-embedded code. The eeID may be included in the set of code information as the eeID is the unique identifier for the environment-embedded code. In an exemplary scenario, there may be more than one unresolved environment-embedded code at the digital transaction location in the physical environment 106. For example, the first user 104a may have utilized the system 102 for generating another environment-embedded code at the digital transaction location for a different application. In such a case, to identify the environment-embedded code that is meant to be resolved by the resolver device 110, the eeID of the environment-embedded code may be provided to the resolver device 110. In an embodiment, the system 102 may retrieve the eeID of the environment-embedded code from the blockchain and transmit the eeID to the resolver device 110. The set of code information may further include an anchor identifier (aID) of the generated set of host anchors. The aID may be utilized by the resolver device 110 to determine information about the set of host anchors, such as the geometry of the set of host anchors.

In step 406, the XR environment may be hosted or executed. In some embodiments, the resolver device 110 may be configured to host or execute the XR environment, based on the received set of code information. For hosting the XR environment, the second user 110a may utilize the application related to the location validation service installed on the resolver device 110. In an exemplary scenario, the second user 110a may be an employee of the courier service that may be utilized by the first user 104a. In such a case, the second user 110a may utilize the location validation service and the system 102 for generating a proof of location. For example, the second user 110a may need to prove that the second user 110a visited the digital transaction location, however, due to non-availability of the first user 104a, the delivery was unsuccessful. The proof of location may be sent to the courier service. For example, the second user 110a may visit the physical environment 106 at the second time instance that may be a later time instance than the first time instance. The application may be opened on the resolver device 110 by the second user 110a. The application may be used to host the XR environment.

In step 408, the physical environment 106 associated with the digital transaction location may be scanned. The resolver device 110 may be utilized by the second user 110a to scan the physical environment 106 to generate second scan data. For example, the resolver device 110 may utilize the at least one sensor 212 (such as camera or LiDAR sensor of the smartphone) and the application to scan the physical environment 106. The resolver device 110 may be moved in the physical environment 106 by the second user 110a to scan the physical environment 106 using the camera. The hosted XR environment may be updated based on the scanned physical environment 106. In an example, the hosted XR environment may correspond to the scanned physical environment 106 and may include the visual features of the scanned physical environment 106.

Based on the scanning of the physical environment 106, the second scan data may be generated. For example, the at least one sensor 212 (e.g., cameras, LiDAR sensor) may capture the visual features, such as the physical objects in the physical environment 106, for example, trees, buildings, roads, and features such as amount of brightness, and the like. The second scan data may further include information related to the location of the physical environment 106, such as geographical coordinates of the location and the postal address acquired by the resolver device 110.

In step 410, the set of resolver anchors may be generated. The resolver device 110 may be configured to generate the set of resolver anchors in the XR environment using the second scan data and the set of code information. The generated set of resolver anchors may be the 3D virtual objects having unique placements in the XR environment that are generated based on the second scan data and the set of code information. Thus, the resolver anchor set geometry may be similar to the host anchor set geometry.

In some embodiments, the second scan data and the set of code information may be provided to the anchor service platform 108. In one or more embodiments, the resolver device 110 may be configured to transmit the second scan data and the set of code information to the anchor service platform 108. The anchor service platform 108 may be associated with a service that may provide anchors or any unique placements for the XR environment based on the 3D understanding of the physical environment 106, or using the set of code information associated with previously generated set of host anchors. In an embodiment, the anchor service platform 108 may be a part of the system 102. The second scan data and the set of code information may be transmitted by the resolver device 110 to the anchor service platform 108 using the communication network 114. The second scan data may be utilized by the anchor service platform 108 to determine the geographical coordinates of the digital transaction location, and to use the geographical coordinates to generate the set of resolver anchors.

In step 412, the set of resolver anchors may be received by the resolver device 110. The resolver anchors reception module 218 of the resolver device 110 may be configured to receive the set of resolver anchors from the anchor service platform 108 using the communication network 114. In an exemplary scenario, the set of resolver anchors may be received by the resolver device 110 in real-time or near real-time at the second time instance. The received set of resolver anchors may be displayed in the XR environment hosted on the application associated with the location validation service. For example, the set of resolver anchors may be displayed in the XR environment at the positions provided by the first user 104a as the user input at the first time instance.

In step 414, the resolver anchor set geometry (denoted as G') may be computed by the resolver device 110. The resolver device 110 may be configured to compute the resolver anchor set geometry based on the set of resolver anchors received from the anchor service platform 108. The set of resolver anchors may be processed by, for example, the geometry computation module 220 of the resolver device 110 to compute the resolver anchor set geometry.

In some embodiments, the resolver anchor set geometry may be further computed based on anchor positions of the set of resolver anchors in the XR environment. For example, the resolver anchor set geometry may be computed by utilizing the positions of each resolver anchor of the set of the resolver anchors. Further, the resolver anchor set geometry may be computed based on distances between the resolver anchors of the set of resolver anchors in the XR environment. In an exemplary scenario, the set of resolver anchors may include three resolver anchors. In such a case, the position of each of the three resolver anchors may be utilized to compute the resolver anchor set geometry. Moreover, the distance between each of the three resolver anchors may be utilized to compute the resolver anchor set geometry. Notably, the placement of the three resolver anchors in the XR environment may form the single line or the triangle. In case the placement of the three resolver anchors in the XR environment forms the triangle, each of the resolver anchor may be considered as a vertex of the formed triangle, and the distance between each vertex may be calculated to compute the resolver anchor set geometry.

In an embodiment, the resolver anchor set geometry may include information about the structural features of the set of resolver anchors, such as the shape, size, orientation, position and relative distances of the set of resolver anchors. The orientation and the position of the set of resolver anchors may be determined using the variety of techniques, such as the GPS, computer vision, or sensors that may be utilized to track the position and the orientation of the objects in the XR environment and/or the physical environment 106.

The resolver anchor set geometry may further be computed based on the vectors of the set of resolver anchors in the XR environment. The computation of the resolver anchor set geometry may be similar to the computation of the host anchor set geometry as explained at 312 in FIG. 3.

In step 416, the computed resolver anchor set geometry may be provided to the system 102. In an embodiment, the geometry transmission module 222 of the resolver device 110 may be configured to transmit the resolver anchor set geometry to the system 102. The geometry transmission module 222 may transmit the computed resolver anchor set geometry via the communication network 114. Further, the system 102 may receive the resolver anchor set geometry and may store the resolver anchor set geometry in the blockchain. The resolver anchor set geometry may further be utilized for the facilitation of the digital transaction.

In step 418, a similarity between the host anchor set geometry and the resolver anchor set geometry may be computed. For example, the similarity computation module 234 of the system 102 may be configured to compute the similarity between the host anchor set geometry and the resolver anchor set geometry. In some embodiments, the system 102 may be configured to compute the similarity of the host anchor set geometry and the resolver anchor set geometry based on a distance correlation metric. The distance correlation metric may be a type of statistical measure that may be used to quantify a dependence between any two variables, such as quantities of the host anchor set geometry and the resolver anchor set geometry. The distance correlation metric may be used to compute the similarity between the set of host anchors and the set of resolver anchors based on a spatial relationship between the set of host anchors and the set of resolver anchors. Notably, the distance correlation metric may be utilized to measure a degree to which the distances between the set of host anchors relates to corresponding pair of the set of resolver anchors. In an embodiment, the similarity may be directly proportional to the distance correlation between the set of host anchors and corresponding the set of resolver anchors. In an example, values of the distance correlation metric may be in a range of zero to one. For example, the lesser the distance between the host anchor and the corresponding resolver anchor, more is the distance correlation, and higher is the similarity, and the value may be closer to one. Similarly, the greater the distance between the host anchor and the corresponding resolver anchor, lesser is the distance correlation and lower is the similarity, and the value may be closer to zero. Thus, one or more values of the distance correlation metric may be determined based on the corresponding distances of the set of host anchors and corresponding the set of resolver anchors. Details of the computation of the similarity between the set of host anchors and the set of resolver anchors are further provided, for example, in FIG. 5.

Figure 5:
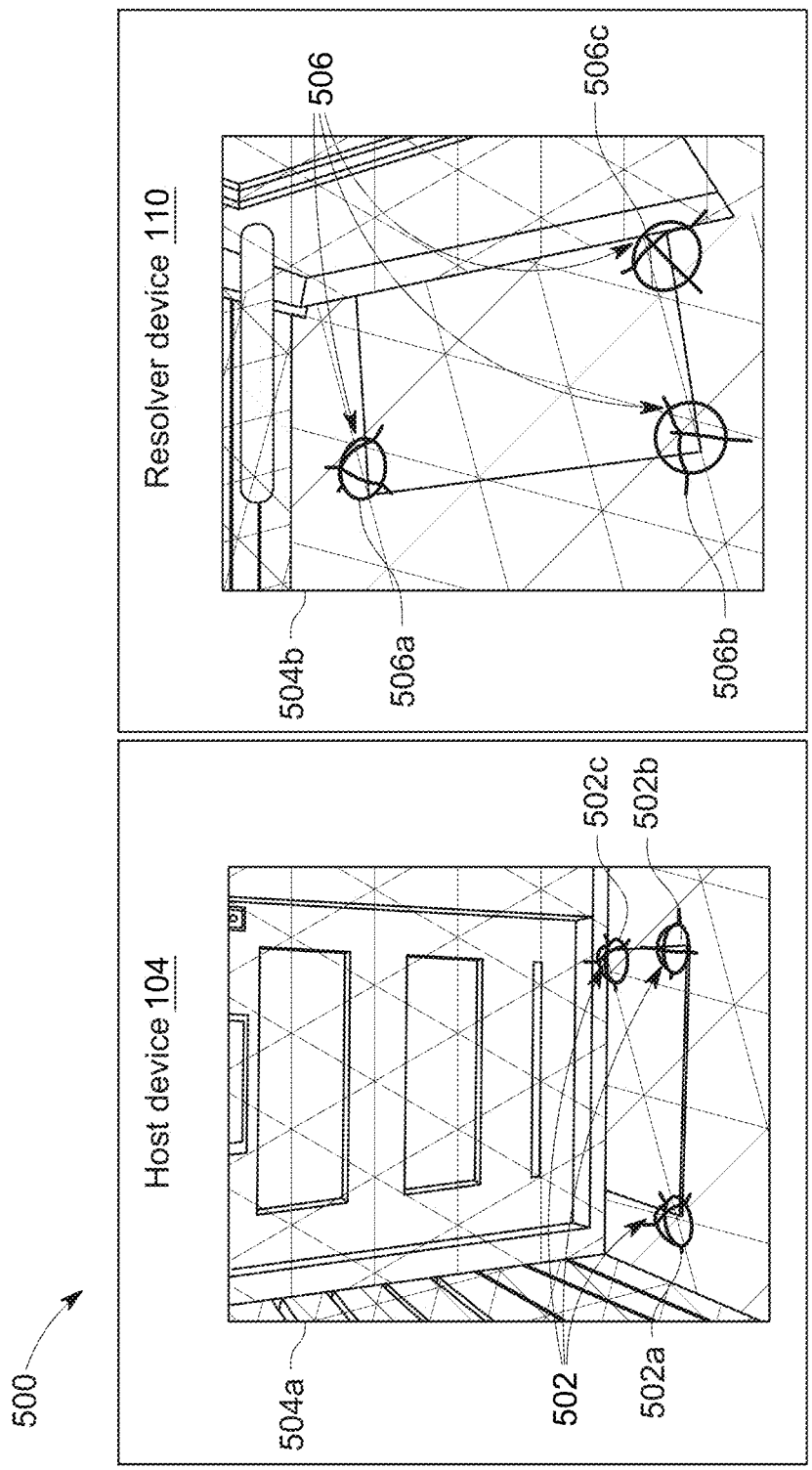
FIG. 5 is a schematic diagram that represents a set of host anchors and a set of resolver anchors in an extended reality (XR) environment, according to one embodiment.

FIG. 5 is a schematic diagram 500 that represents the set of host anchors and the set of resolver anchors in the extended reality (XR) environment, according to one embodiment. FIG. 5 may include a set of host anchors 502 placed in an XR environment 504a hosted by the host device 104. Further, an XR environment 504b hosted on the resolver device 110 may include a set of resolver anchors 506. The set of host anchors 502 may include a first host anchor 502a, a second host anchor 502b, and a third host anchor 502c. Similarly, the set of resolver anchors 506 may include a first resolver anchor 506a, a second resolver anchor 506b, and a third resolver anchor 506c.

In various embodiments, the system 102, the host device 104 and/or the resolver device 110 may perform one or more portions of the operations of the diagram 500 and may be implemented in, for instance, a chip set including a processor and a memory as shown in FIG. 8 and FIG. 9. As such, the system 102, the host device 104 and/or the resolver device 110 may provide means for accomplishing various parts of the operations, as well as means for accomplishing embodiments of other processes described herein in conjunction with other components of the network environment 100.

In an exemplary scenario, the physical environment 106 may be scanned by the first user 104a at the first time instance to generate the XR environment 504a. The user input may be received from the first user 104a to define the placement of the set of host anchors 502. For example, the user input may be provided as the touch input on the display of the host device 104 to place the first host anchor 502a at a first position, the second host anchor 502b at a second position, and the third host anchor 502c at a third position in the XR environment 504a. In some embodiments, the set of host anchors 502 may be received by the host device 104 from the anchor service platform 108. The set of host anchors 502 may be displayed in the XR environment 504a hosted on the application on the host device 104 to the first user 104a. The host anchor set geometry may further be computed by the host device 104.

Furthermore, the physical environment 106 may be scanned by the second user 110a at the second time instance to generate the XR environment 504b. The set of code information may be received by the resolver device 110. Further, the second scan data may be utilized by the resolver device 110 to receive the set of resolver anchors 506 from the anchor service platform 108. The generation of the set of resolver anchors 506 may be independent of a pose of the resolver device 110 in the physical environment 106. For example, the first resolver anchor 506a may be placed at a first position, the second resolver anchor 506b may be placed at a second position, and the third resolver anchor

506c may be placed at a third position in the XR environment 504b, corresponding to the positions of the set of host anchors 502 in the XR environment 504a. The set of resolver anchors 506 may be displayed in the XR environment 504b hosted on the application on the resolver device 110 to the second user 110a. The resolver anchor set geometry may further be computed by the resolver device 110.

The host anchor set geometry and the resolver anchor set geometry may include the tensor of each of the set of host anchors 502 and the set of resolver anchors 506 in the corresponding XR environment. The tensor may correspond to the 3D positions of the set of host anchors 502 and the set of resolver anchors 506 in the corresponding XR environment. The tensors may refer to the set of host anchors 502 and the set of resolver anchors 506. The tensors i.e., the set of host anchors 502 and the set of resolver anchors 506 may be generated by utilizing the respective first scan data and the second scan data from the at least one sensor (such as the camera, LiDAR sensor, accelerometer, gyroscope or the like that may provide information about a position, a rotation, and movement) of the host device 104 or the resolver device 110. Thus, utilizing the tensors as the set of host anchors 502 and the set of resolver anchors 506 enables the computation of the host anchor set geometry and the resolver anchor set geometry that is independent of a reference frame in the XR environment and the pose of the host device 104 and the resolver device 110.

Furthermore, in order to compute the similarity, the system 102 may for example, compute a distance between the first host anchor 502a in the XR environment 504a and the corresponding first resolver anchor 506a in the XR environment 504b. Similarly, the system 102 may compute a distance between the second host anchor 502b in the XR environment 504a and the corresponding second resolver anchor 506b in the XR environment 504b. In a similar manner, the system 102 may compute a distance between the third host anchor 502c in the XR environment 504a and the corresponding third resolver anchor 506c in the XR environment 504b. Based on the distances, the distance correlation metric may be obtained. The reference for the distance correlation metric is taken from "GÁBOR J. SZÉKELY, MARIA L. RIZZO AND NAIL K. BAKIROV (2007), MEASURING AND TESTING DEPENDENCE BY CORRELATION OF DISTANCES, *THE ANNALS OF STATISTICS*, VOL. 35, No. 6". The distance correlation metric may be used to test a joint independence of random vectors, such as the set of host anchors 502 and the corresponding set of resolver anchors 506. Similar to the distance correlation metric explained in the referenced paper, a suitable a noise robust distance metric may be used to determine the similarity. Thus, the one or more values of the distance correlation metric may be determined based on the distances between the set of host anchors 502 and the corresponding resolver anchors of the set of resolver anchors 506.

Referring again to FIG. 4, in step 420, a verification result may be generated. For example, the verification result generation module 236 of the system 102 may be configured to generate the verification result for the environment-embedded code based on the computed similarity between the host anchor set geometry and the resolver anchor set geometry. The similarity between the host anchor set geometry and the resolver anchor set geometry may be computed based on the distance correlation metric to generate the verification result.

In some embodiments, the verification result may indicate a successful verification of the environment-embedded code. The successful verification may be based on a determination that one or more values in the distance correlation metric is higher than or equal to a threshold value. For example, each of the one or more values may indicate the distance correlation between host anchors of the set of host anchors 502 and the corresponding resolver anchors of the set of resolver anchors 506. In an embodiment, the threshold value may be defined by the system 102 as a minimum acceptable value corresponding to similarity. For example, the threshold value may be 0.7. In such a case, when the one or more values in the distance correlation metric is higher than or equal to 0.7, the verification result may indicate the successful verification of the environment-embedded code. For example, a first value in the distance correlation metric associated with the distance between the first host anchor 502a and the corresponding first resolver anchor 506a is "0.9". Further, a second value in the distance correlation metric associated with the distance between the second host anchor 502b and the corresponding second resolver anchor 506b is "0.86". In such a case, the verification result may indicate the successful verification of the environment-embedded code. In an embodiment, an average of the one or more values in the distance correlation metric may be calculated. In case the average of the one or more values is higher than or equal to the threshold, the verification result may indicate the successful verification of the environment-embedded code.

In one or more embodiments, the verification result may indicate a failed verification of the environment-embedded code. The failed verification may be based on a determination that the one or more values in the distance correlation metric is lower than the threshold value. For example, the threshold value may be 0.7. In such a case, when the one or more values in the distance correlation metric is lower than 0.7, the verification result may indicate the failed verification of the environment-embedded code. For example, a first value in the distance correlation metric associated with the distance between the first host anchor 502a and the corresponding first resolver anchor 506a is "0.56". Further, a third value in the distance correlation metric associated with the distance between the third host anchor 502c and the corresponding third resolver anchor 506c is "0.42". In such a case, the verification result may indicate the failed verification of the environment-embedded code. In an embodiment, an average of the one or more values in the distance correlation metric may be calculated. In case the average of the one or more values is lower than or equal to the threshold, the verification result may indicate the failed verification of the environment-embedded code.

In step 422, the digital transaction may be provided for initiation by the system 102. The digital transaction may be provided for initiation based on the generated verification result. For example, the system 102 may complete the initiated digital transaction based on the determination that the generated verification result indicates the successful verification of the environment-embedded code, further explained in step 424. In another example, the system 102 may prevent completion of the initiated digital transaction based on the determination that the generated verification result indicates the failed verification of the environment-embedded code, further explained in step 428.

In step 424, when the generated verification result indicates the successful verification of the environment-embedded code, the system 102 may resolve the environment-embedded code associated with the digital transaction location. In some embodiments, the system 102 may generate a proof of location (POL) certificate for completion of the initiated digital transaction. The POL certificate may be generated based on the determination that the verification result indicates the successful verification of the environment-embedded code. For example, the POL certificate may be a document that serves as a proof of having visited the location for the second user 110a. The POL certificate may include information such as a date and a time of the location based digital transactions, the geographical co-ordinates of the digital transaction location. The POL certificate may further indicate the completion of the initiated digital transaction between the host device 104 and the resolver device 110.

In step 426, the POL certificate may be issued. For example, the certificate generation module 238 of the system 102 may be configured to issue the POL certificate to the second user 110a and may transmit the issued POL certificate to the resolver device 110. In an embodiment, the POL certificate may be associated with a certificate ID that may be utilized by the second user 110a as the proof of the visited location. In some embodiments, the POL certificate may be utilized for various legal and administrative purposes by the second user 110a. In an embodiment, the POL certificate may be stored in the system 102 or the blockchain.

In step 428, when the generated verification result indicates the failed verification of the environment-embedded code, the system 102 may report verification error. In some embodiments, the system 102 may be configured to report the verification error to the second user 110a via the resolver device 110. In such a case, the system 102 may be configured to prevent completion of the initiated digital transaction. In an exemplary scenario, the second user 110a may be trying to resolve the environment-embedded code, after the validity time period, or the second user 110a may be at a different location than the digital transaction location. In such scenarios, the verification error may be reported. For example, the verification error may be reported by use of visual output such as push notifications transmitted to the resolver device 110. In another example, the verification error may be reported by use of audio output such as beep sound or by use of haptic output such as vibrations generated on the resolver device 110. In yet another example, the verification error may be reported via an API or the like, for handling by another application or system connected to the API.

Figure 6A:
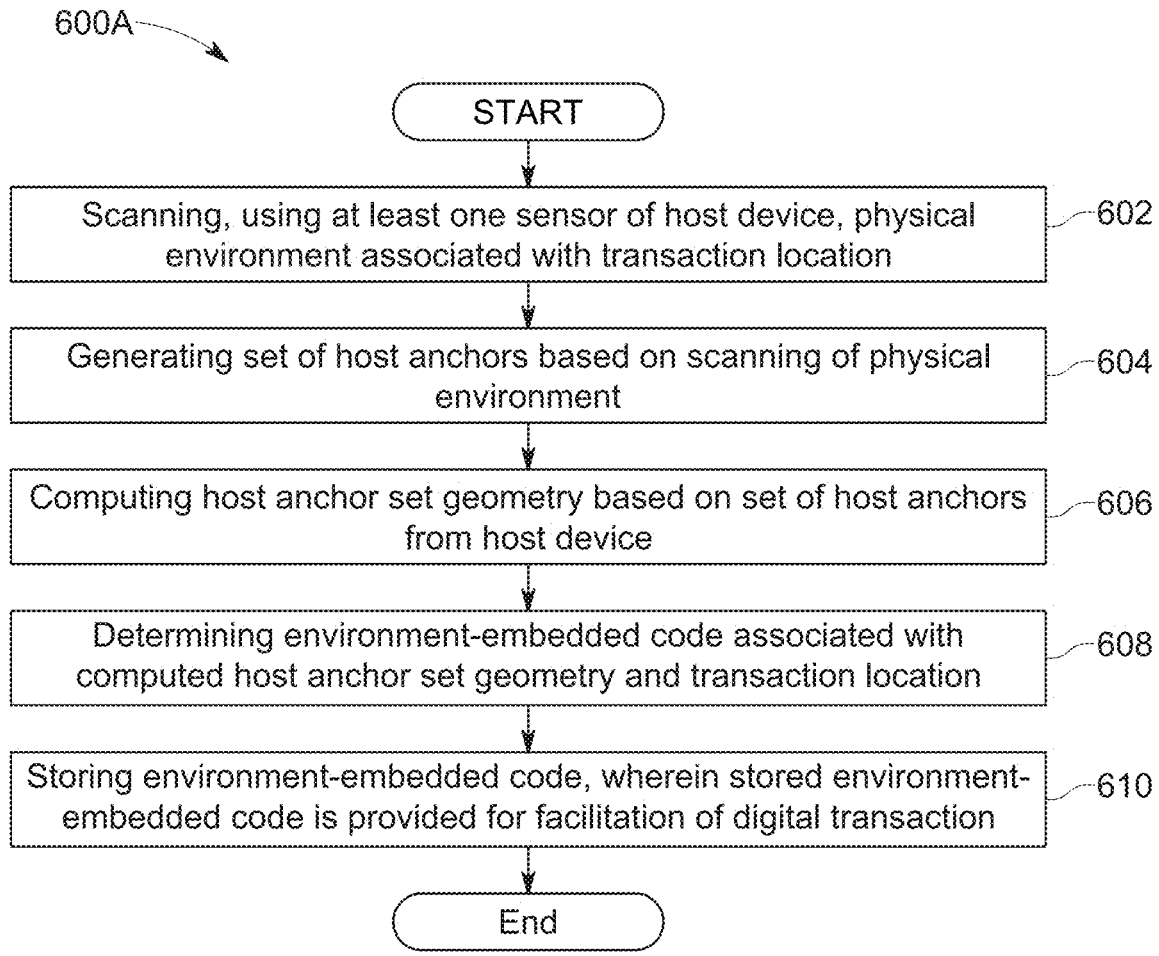
FIG. 6A is a flowchart of a method for generating an environment-embedded code for facilitation of the digital transaction between the host device and the resolver device, according to one embodiment.

FIG. 6A is a flowchart of a method 600A for facilitating the digital transaction between the host device 104 and the resolver device 110, according to one embodiment. In various embodiments, the system 102, the host device 104 and/or the resolver device 110 may perform one or more portions of the method 600A and may be implemented in, for instance, a chip set including a processor and a memory as shown in FIG. 8 and FIG. 9. In some embodiments, a computer program product may comprise instructions to perform one or more portions of the method 600A. As such, the system 102, the host device 104 and/or the resolver device 110 may provide means for accomplishing various parts of the method 600A, as well as means for accomplishing embodiments of other processes described herein in conjunction with other components of the network environment 100. Although the method 600A is illustrated and described as a sequence of steps, it is contemplated that various embodiments of the method 600A may be performed in any order or combination and need not include all of the illustrated steps.

In step 602, the physical environment 106 associated with the digital transaction location may be scanned. The scanning may be performed using the at least one sensor 202 of the host device 104. For example, the first user 104a may visit the digital transaction location to scan the physical environment 106 at the first time instance. The scanning of the physical environment 106 may be performed to generate the first scan data that may be further used by the anchor service platform 108 to generate the set of host anchors 502 in the XR environment 504a. Details of the scanning of the physical environment 106 is provided, for example, in step 304 of the FIG. 3.

In step 604, the set of host anchors 502 may be generated based on the scanning of the physical environment 106. The anchor service platform 108 may utilize the first scan data to generate the set of host anchors 502. In an embodiment, the host device 104 may generate the set of host anchors 502 based on the first scan data and the user input received from the first user 104a. Details of the generation of the set of host anchors 502 are further provided, for example, in step 306 and 308 in FIG. 3.

In step 606, the host anchor set geometry may be computed based on the set of host anchors 502 received from the host device 104. The host device 104 may be configured to compute the host anchor set geometry based on the set of host anchors 502. Details of the computation of the host anchor set geometry are further provided, for example, in step 312 in FIG. 3.

In step 608, the environment-embedded code may be determined. The environment-embedded code may be associated with the computed host anchor set geometry and the digital transaction location. The system 102 may be configured to determine the environment-embedded code. The determined environment-embedded code may be utilized further to initiate the digital transaction between two parties (for example, the host device 104 and the resolver device 110). Details of the determination of the environment-embedded code are further provided, for example, in step 316 in FIG. 3.

In step 610, the determined environment-embedded code may be stored in the blockchain implementing the system 102. The system 102 may utilize the stored environment-embedded code for facilitation of the digital transaction at the location of scanned physical environment 106. Details of the storage of the environment-embedded code are further provided, for example, in step 320 in FIG. 3.

Figure 6B:
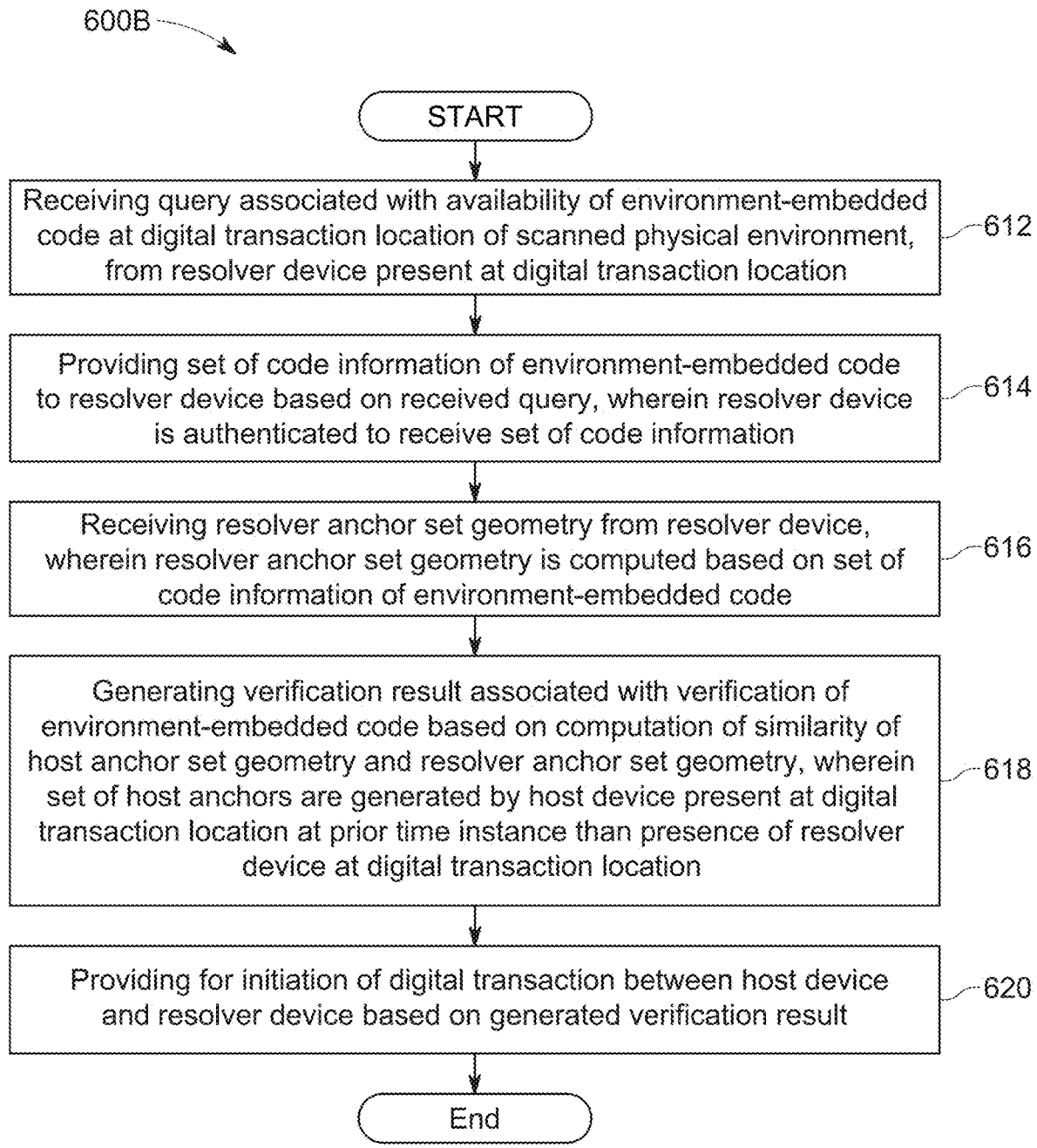
FIG. 6B is a flowchart of a method for providing for initiation of the digital transaction between the host device and the resolver device, according to one embodiment.

FIG. 6B is a flowchart of a method 600B for providing for initiation of the digital transaction between the host device 104 and the resolver device 110, according to one embodiment. In various embodiments, the system 102, the host device 104 and/or the resolver device 110 may perform one or more portions of the method 600B and may be implemented in, for instance, the chip set including the processor and the memory as shown in FIG. 8 and FIG. 9. In some embodiments, the computer program product may comprise instructions to perform one or more portions of the method 600B. As such, the system 102, the host device 104 and/or the resolver device 110 may provide means for accomplishing various parts of the method 600B, as well as means for accomplishing embodiments of other processes described herein in conjunction with other components of the network environment 100. Although the method 600B is illustrated and described as a sequence of steps, it is contemplated that various embodiments of the method 600B may be performed in any order or combination and need not include all of the illustrated steps.

In step 612, the query may be received. In some embodiments, the system 102 may be configured to receive the query from the resolver device 110. The query may be associated with the environment-embedded code at the digital transaction location of the scanned physical environment 106. The query may be received by the system 102 when the resolver device 110 may be present at or near the digital transaction location at the second time instance that may be a later time instance than the first time instance. Details of the reception of the query are further provided, for example, in step 402 of FIG. 4.

In step 614, the set of code information of the environment-embedded code may be provided by the system 102 to the resolver device 110. The set of code information may be provided to the resolver device 110 based on the received query. The system 102 may authenticate the presence of the resolver device 110 at the digital transaction location to execute the location smart contract associated with the digital transaction. Details of providing the set of code information are further provided, for example, in step 404 of FIG. 4.

In step 616, the computed resolver anchor set geometry may be received by the system 102. In an embodiment, the geometry transmission module 222 of the resolver device 110 may be configured to transmit the resolver anchor set geometry to the system 102. The resolver anchor set geometry may be computed based on the set of code information of the environment-embedded code. Details of reception of the resolver anchor set geometry are further provided, for example, in step 416 of FIG. 4.

In step 618, the verification result may be generated. The system 102 may be configured to generate the verification result for the environment-embedded code based on the computed similarity between the host anchor set geometry and the resolver anchor set geometry. The similarity between the host anchor set geometry and the resolver anchor set geometry may be computed based on the distance correlation metric to generate the verification result. Details of generation of the verification result are further provided, for example, in step 420 of FIG. 4.

In step 620, the digital transaction may be provided for initiation by the system 102. The digital transaction may be provided for initiation based on the generated verification result. For example, the system 102 may complete the initiated digital transaction based on the determination that the generated verification result indicates the successful verification of the environment-embedded code, further explained in step 424. In another example, the system 102 may prevent completion of the initiated digital transaction based on the determination that the generated verification result indicates the failed verification of the environment-embedded code. Details of providing for initiation of the digital transaction are further provided, for example, in steps 422, 424 and 428 of FIG. 4.

Figure 6C:
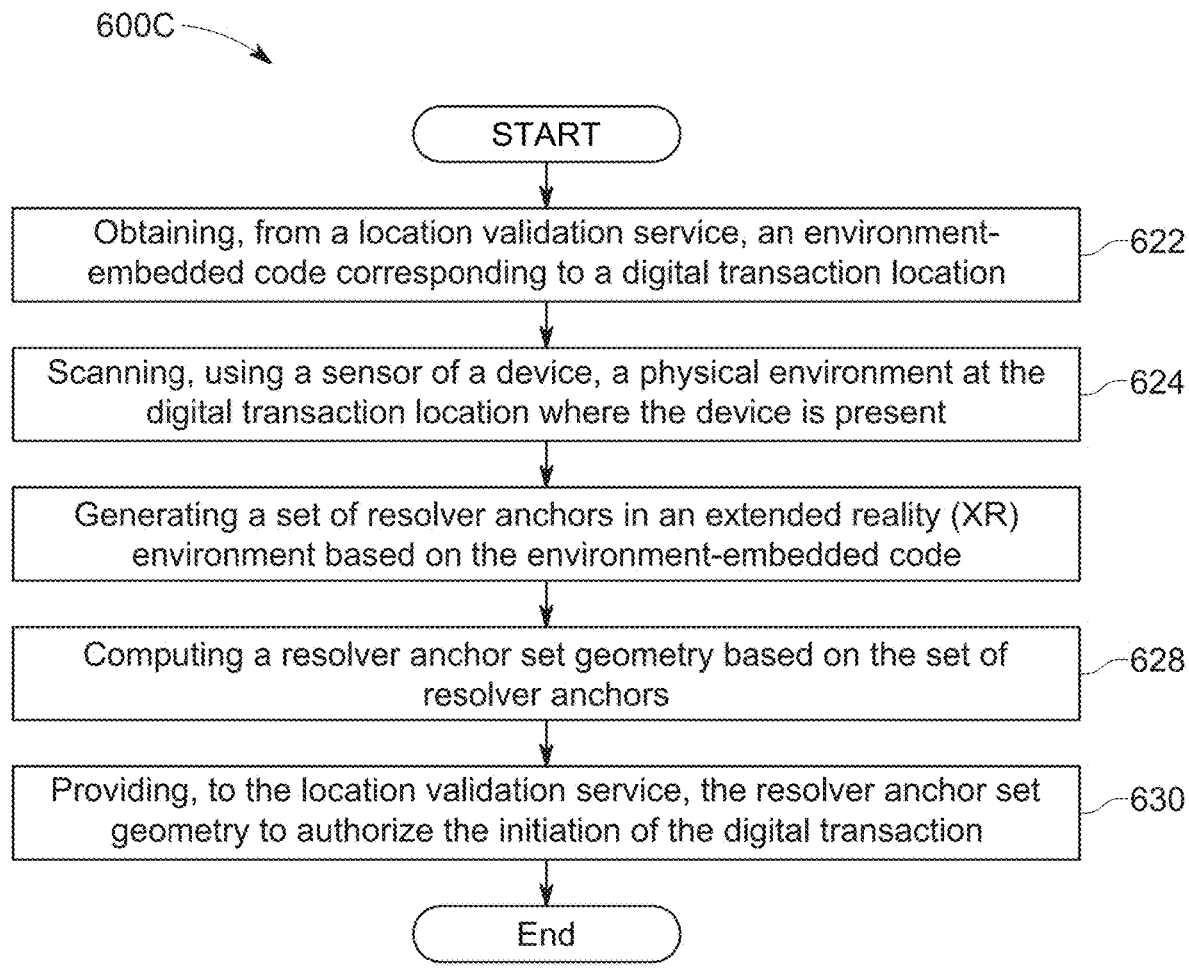
FIG. 6C is a flowchart of a method for utilization of a location validation service for facilitation of the digital transaction between the host device and the resolver device.

FIG. 6C is a flowchart of a method 600C for utilization of a location validation service for facilitation of the digital transaction between the host device 104 and the resolver device 110. In various embodiments, the system 102, the host device 104 and/or the resolver device 110 may perform one or more portions of the method 600C and may be implemented in, for instance, the chip set including the processor and the memory as shown in FIG. 8 and FIG. 9. In some embodiments, the computer program product may comprise instructions to perform one or more portions of the method 600C. As such, the system 102, the host device 104 and/or the resolver device 110 may provide means for accomplishing various parts of the method 600C, as well as means for accomplishing embodiments of other processes described herein in conjunction with other components of the network environment 100. Although the method 600C is illustrated and described as a sequence of steps, it is contemplated that various embodiments of the method 600C may be performed in any order or combination and need not include all of the illustrated steps.

In step 622, the environment-embedded code may be received from the location validation service. In some embodiments, the resolver device 110 may receive the environment-embedded code may be received from the location validation service. In an example, the location validation service may be, for example, an online service that may be provided by the system 102, for the location based digital transactions. Moreover, the environment-embedded code may be received by the resolver device 110 as the resolver device 110 may be authenticated to receive the environment-embedded code. Details of the reception of the environment-embedded code are further provided, for example, in step 404 of FIG. 4.

In step 624, the physical environment 106 associated with the digital transaction location may be scanned. The resolver device 110 may be utilized by the second user 110a to scan the physical environment 106 to generate second scan data. For example, a device such as the resolver device 110 may utilize the at least one sensor 212 (such as camera of the smartphone) and the application to scan the physical environment 106 where the resolver device 110 may be present. The resolver device 110 may be moved in the physical environment 106 by the second user 110a to scan the physical environment 106 using the camera. Details of scanning the physical environment 106 are further provided, for example, in step 408 of FIG. 4.

In step 628, the resolver anchor set geometry may be computed by the resolver device 110. The resolver device 110 may be configured to compute the resolver anchor set geometry based on the set of resolver anchors received from the anchor service platform 108. The set of resolver anchors may be processed by, for example, the geometry computation module 220 of the resolver device 110 to compute the resolver anchor set geometry. Details of computation of the resolver anchor set geometry are further provided, for example, in step 414 of FIG. 4.

In step 630, the computed resolver anchor set geometry may be provided to the system 102 or the location validation service. The resolver anchor set geometry may further be utilized to authorize the initiation of the digital transaction. Details of providing the resolver anchor set geometry are further provided, for example, in step 416 of FIG. 4.

Returning to FIG. 1, as shown, the network environment 100 includes the system 102 for facilitating the digital transaction between the host device 104 and the resolver device 110. In some embodiments, the geographical database 114 may be a part of the blockchain.

The physical environment 106 may be a geographical region that includes the digital transaction location. The first user 104a and the second user 110a may visit the physical environment 106, for example, at different time instances to facilitate the digital transaction at the digital transaction location.

In an exemplary scenario, the physical environment 106 may be a room in a hotel, and the digital transaction location may be a digital lock in the room. In such a case, the first user 104a may be the user account associated with the hotel, and the second user 110a may be the resident of the room.

In another exemplary scenario, the physical environment 106 may be a parking area, and the digital transaction location may be a parking spot in the parking area. In such a case, the first user 104a may be the user account associated with municipality handing the parking area, and the second user 110a may be a driver at the parking spot.

In another exemplary scenario, the physical environment 106 may be a certain shop, and the digital transaction location may be an entrance of the shop. In such a case, the first user 104a may be the user account associated with an advertiser who may want to target customers in the shop, and the second user 110a may be the customer entering the shop.

In another exemplary scenario, the physical environment 106 may be a certain residential area, and the digital transaction location may be entrances of building in the residential area. In such a case, the first user 104a may be the user account associated with security services, and the second user 110a may be the security guard patrolling near the entrances of building in the residential area.

In another exemplary scenario, the physical environment 106 may be a certain office space, and the digital transaction location may be a cubicle in the office space. In such a case, the first user 104a may be a first employee who wishes to send a message to a second employee at his cubicle, and the second user 110a may be the second employee at the cubicle.

In one embodiment, the system 102 has connectivity over the communication network 114 to the anchor services platform 108 that provides the one or more services that can use the blockchain for downstream functions. By way of example, the one or more services provided by the anchors service platform 108 may be third party services and include but is not limited to generating the set of host anchors 502 and the set of resolver anchors 506. In one embodiment, the anchors service platform 108 uses the output of the system 102, the host device 104 and the resolver device 110 to provide the one or more services.

The system 102 may be integrated with the blockchain. In some embodiments, the system 102 may be the blockchain capable of performing the steps for facilitation of the digital transaction. In one embodiment, the system 102 may be a platform with multiple interconnected components. The system 102 may include multiple servers, intelligent networking devices, computing devices, components, and corresponding software for initiation and facilitation of the digital transaction, according to the various embodiments described herein. In addition, it is noted that the system 102 may be a separate entity of the network environment 100, a part of the host device 104, a part of the resolver device 110, or a part of the anchors services platform 108.

In one embodiment, devices such as the host device 104 and the resolver device 110 may execute software applications (not shown in the figures) to host the XR environment, generate the set of host anchors 502 and the set of resolver anchors 506 respectively in the XR environment or other use data derived therefrom according to the embodiments described herein. By way of example, the applications may also be any type of application that is executable on the host device 104 and the resolver device 110, such as digital transaction application, mapping applications, location-based service applications, navigation applications, device control applications, content provisioning services, camera/imaging application, media player applications, social networking applications, calendar applications, and the like. In one embodiment, the applications may function as a client for the system 102 and perform one or more functions associated with generation of the set of host anchors 502 and/or the set of resolver anchors 506 in combination with the system 102 and/or anchor service platform 108.

By way of example, the host device 104 and the resolver device 110 are or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the host device 104 and the resolver device 110 can support any type of interface to the user (such as "wearable" circuitry, etc.). In one embodiment, the host device 104 and the resolver device 110 may be associated with or be a component of any other device.

In one embodiment, the host device 104 and the resolver device 110 may be configured with various sensors for generating or collecting the image data of the physical environment 106, related geographic data, etc. In one embodiment, the image data represent data associated with a geographic location or coordinates at which sensor data was collected, and the polyline or polygonal representations of detected objects of interest derived therefrom to generate the digital map data of the geographic database 112. By way of example, the sensors may include a global positioning sensor for gathering location data (e.g., the GPS, GALILEO, BEIDOU, global navigation satellite system (GLONASS)), inertial measurement unit (IMUs), a network detection sensor for detecting wireless signals or receivers for different short-range communications (e.g., Bluetooth, wireless fidelity (Wi-Fi), light fidelity (Li-Fi), near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the host device 104 and the resolver device 110 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the host device 104 and the resolver device 110 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 106 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the blockchain may be a distributed ledger. For example, the blockchain may be a distributed ledger that uses a unique data structure and consensus algorithm to ensure the integrity and immutability of data stored on it. The blockchain may include a continuous growing chain of blocks. Each of the blocks includes list of the digital transactions that have been verified and added to the blockchain. The blocks of the blockchain are linked together using cryptography that make the blocks a permanent, and tamper-proof. Once the digital transaction is recorded in the blockchain, the transaction cannot be altered or deleted without consensus of the first user 110*a* or the second user 110*a*.

Moreover, the blockchain may be a permissioned blockchain infrastructure that may be configured to provide a modular architecture with a delineation of roles between nodes in the blockchain infrastructure, execution of the location smart contract and configurable consensus and membership services. The blockchain may include "peer nodes" that may be configured to execute the location smart contract, access ledger data such as the set of code information, endorse the digital transactions and interface with applications such as the applications associated with the location validity services. The blockchain may further include "Orderer nodes" that may be configured to ensure consistency of the blockchain and deliver the digital transactions to the peers of the blockchain. The blockchain may further include Membership Service Providers (MSPs) that may be implemented as a Certificate Authority, that may be used to authenticate identity of members of the blockchain and their roles. The blockchain may be aimed at integration projects, in which a distributed ledger technology (DLT) may be required, offering no user facing services other than services that may allow for execution of executable code.

In one embodiment, the communication network 114 of the network environment 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the system 102, the anchor service platform 108, the host device 104 and the resolver device 110 may communicate with each other and other components of the network environment 100 using well known, new or still developing protocols. In this context, a protocol includes a set of rules defining how the network nodes within the communication network 114 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
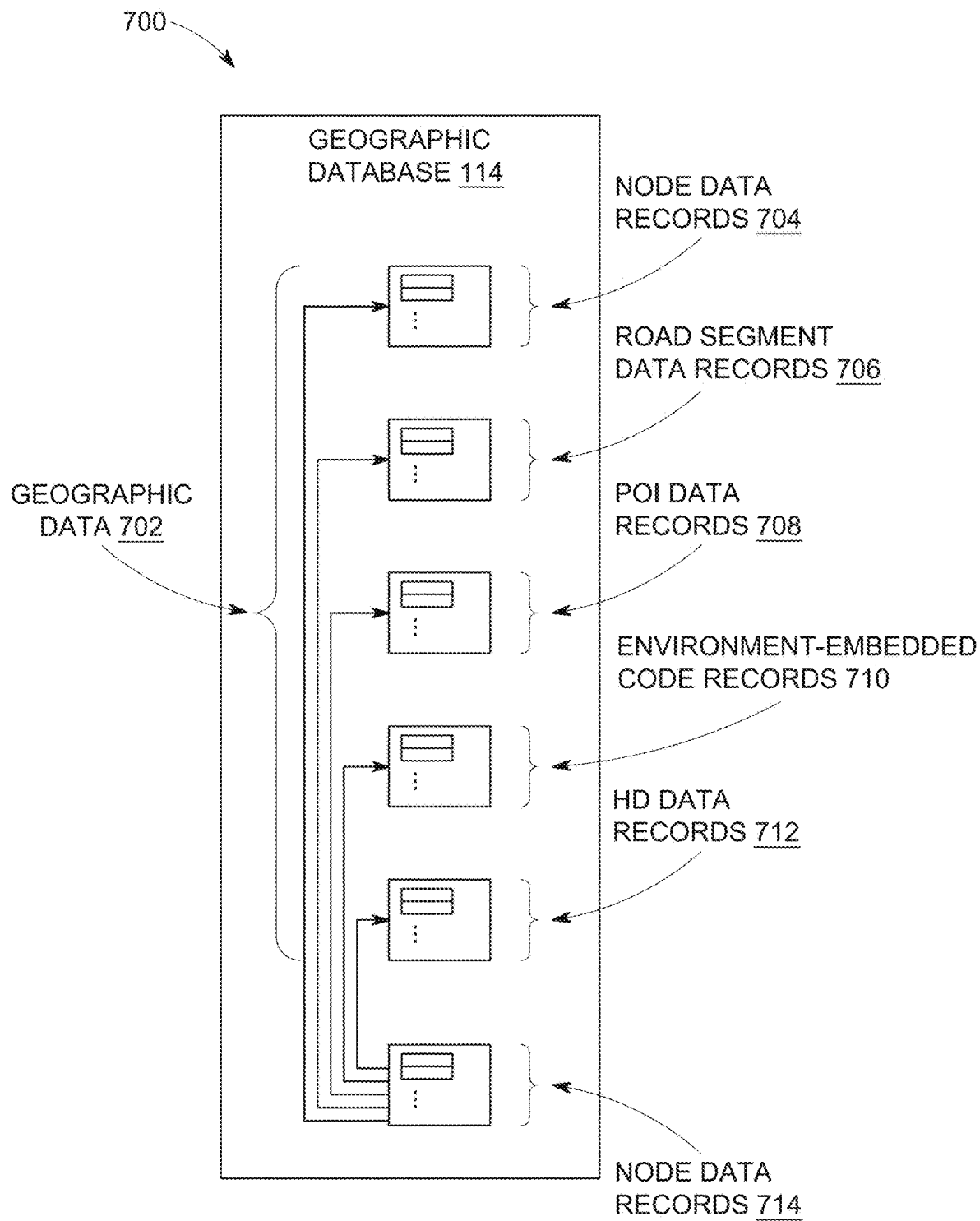
FIG. 7 is a diagram of a geographic database, according to one embodiment.

FIG. 7 is a diagram of the geographic database 112, according to one embodiment. In an implementation, the geographic database 112 may be a part of the blockchain. In one embodiment, the geographic database 112 includes geographic data 702 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 702. In one embodiment, the geographic database 112 includes high definition (HD) mapping data that provide centimeter-level or better accuracy of map features. For example, the geographic database 112 can be based on Light Detection and Ranging (LiDAR) or equivalent technology to collect billions of 3D points and model road surfaces and other map features down to the number lanes and their widths. In one embodiment, the HD mapping data (e.g., HD data records 712) and/or other mapping data of the geographic database 112 capture and store details such as but not limited to road attributes and/or other features related to generating speed profile data. These details include but are not limited to road width, number of lanes, turn maneuver representations/guides, traffic lights, light timing/stats information, slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 112.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 112 follows certain conventions. For example, links do not cross themselves and do not cross each other except at a node. Also, there are no duplicated shape points, nodes, or links. Two links that connect each other have a common node. In the geographic database 112, overlapping geographic features are represented by overlapping polygons. When polygons overlap, the boundary of one polygon crosses the boundary of the other polygon. In the geographic database 112, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 112 includes node data records 704, road segment or link data records 706, POI data records 708, environment-embedded code records 710, HD mapping data records 712, and indexes 714, for example. More, fewer, or different data records can be provided. In some embodiments, the environment-embedded code records 710 may be stored in the system 102 or the blockchain. In one embodiment, additional data records (not shown) can include cartographic ("carto") data records, routing data, and maneuver data. In one embodiment, the indexes 714 may improve the speed of data retrieval operations in the geographic database 112. In one embodiment, the indexes 714 may be used to quickly locate data without having to search every row in the geographic database 112 every time it is accessed. For example, in one embodiment, the indexes 714 can be a spatial index of the polygon points associated with stored feature polygons. In one or more embodiments, data of a data record may be attributes of another data record.

In exemplary embodiments, the road segment data records 706 are links or segments representing roads, streets, paths, or bicycle lanes, as can be used in the calculated route or recorded route information for determination of speed profile data. The node data records 704 are end points (for example, representing intersections or an end of a road) corresponding to the respective links or segments of the road segment data records 706. The road segment data records 706 and the node data records 704 represent a road network, such as used by vehicles, cars, and/or other entities. Alternatively, the geographic database 112 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 112 can include data about the POIs and their respective locations in the POI data records 708. The geographic database 112 can also include data about road attributes (e.g., traffic lights, stop signs, yield signs, roundabouts, lane count, road width, lane width, etc.), places, such as cities, towns, or other communities, and other geographic features, such as bodies of water, mountain ranges, etc. Such place or map feature data can be part of the POI data records 708 or can be associated with POIs or POI data records 708 (such as a data point used for displaying or representing a position of a city).

In one embodiment, the geographic database 112 can also include the environment-embedded code records 710 for storing the environment-embedded code data, street segment definitions (e.g., link IDs and parametric offsets), trained machine learning models, and/or any other related data that is used or generated according to the embodiments described herein. By way of example, the environment-embedded code records 710 can be associated with one or more of the node records 704, the road segment records 706, and/or the POI data records 708 to associate the speed profile data records with specific places, POIs, geographic areas, and/or other map features. In this way, the linearized data records can also be associated with the characteristics or metadata of the corresponding records 704, 706, and/or 708.

In one embodiment, as discussed above, the HD mapping data records 712 model road surfaces and other map features to centimeter-level or better accuracy. The HD mapping data records 712 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 712 are divided into spatial partitions of varying sizes to provide HD mapping data to end user devices with near physical-time speed without overloading the available resources of the devices (e.g., computational, memory, bandwidth, etc. resources).

In one embodiment, the HD mapping data records 712 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 712.

In one embodiment, the HD mapping data records 712 also include physical-time sensor data collected from probe vehicles in the field. The physical-time sensor data, for instance, integrates physical-time traffic information, weather, and road conditions (e.g., potholes, road friction, road wear, etc.) with highly detailed 3D representations of street and geographic features to provide precise physical-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 112 can be maintained by the content provider 110 in association with the system 102 (e.g., a map developer or service provider). The map developer can collect geographic data to generate and enhance the geographic database 112. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 112 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generation of the environment-embedded code for facilitation of the digital transaction may be advantageously implemented via software, hardware (e.g., general processor, Digital Signal Processing (DSP) chip, an application Specific Integrated Circuit (ASIC), Field Programmable Gate Arrays (FPGAs), etc.), firmware or a combination thereof. Such exemplary hardware for performing the described functions is detailed below.

FIG. 8 is a diagram of hardware that can be used to implement an embodiment. Computer system 800 is programmed (e.g., via computer program code or instructions) for generation of the environment-embedded code for facilitation of the digital transaction as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to generation of the environment-embedded code for facilitation of the digital transaction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

The computer system 800 also includes a memory 804 coupled to bus 810. The memory 804, such as a random access memory (RAM) or other dynamic storage device, stores information including processor instructions for generation of the environment-embedded code for facilitation of the digital transaction. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, which is not changed by the computer system 800. Some memory is composed of volatile storage that loses the information stored thereon when power is lost. Also coupled to the bus 810 is a non-volatile (persistent) storage device 808, such as a magnetic disk, optical disk, or flash card, for storing information, including instructions, which persists even when the computer system 800 is turned off or otherwise loses power.

Information, including instructions for generation of the environment-embedded code for facilitation of the digital transaction, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 818, is coupled to the bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 800 also includes one or more instances of a communications interface 820 coupled to bus 810. The communication interface 820 provides a one-way or two-way communication coupling to a variety of external devices that operate with their own processors, such as printers, scanners, and external disks. In general, the coupling is with a network link 822 that is connected to a local network 824 to which a variety of external devices with their own processors are connected. For example, the communication interface 820 may be a parallel port or a serial port or a universal serial bus (USB) port on a personal computer. In some embodiments, communications interface 820 is an integrated services digital network (ISDN) card or a digital subscriber line (DSL) card or a telephone modem that provides an information communication connection to a corresponding type of telephone line. In some embodiments, the communication interface 820 is a cable modem that converts signals on the bus 810 into signals for a communication connection over a coaxial cable or into optical signals for a communication connection over a fiber optic cable. As another example, communications interface 820 may be a local area network (LAN) card to provide a data communication connection to a compatible LAN, such as Ethernet. Wireless links may also be implemented. For wireless links, the communications interface 820 sends or receives or both sends and receives electrical, acoustic, or electromagnetic signals, including infrared and optical signals, which carry information streams, such as digital data. For example, in wireless handheld devices, such as mobile telephones like cell phones, the communications interface 820 includes a radio band electromagnetic transmitter and receiver called a radio transceiver. In certain embodiments, the communications interface 820 enables connection to the communication network 124 for generation of the environment-embedded code for facilitation of the digital transaction.

The term computer-readable medium is used herein to refer to any medium that participates in providing information to processor 802, including instructions for execution. Such a medium may take many forms, including, but not limited to, non-volatile media, volatile media, and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 822 typically provides information communication using transmission media through one or more networks to other devices that use or process the information. For example, the network link 822 may provide a connection through local network 824 to a host computer 826 or to equipment 828 operated by an Internet Service Provider (ISP). ISP equipment 828 in turn provides data communication services through the public, world-wide packet-switching communication network of networks now commonly referred to as the Internet 830.

A computer called a server host 832 connected to the Internet hosts a process that provides a service in response to information received over the Internet. For example, server host 832 hosts a process that provides information representing video data for presentation at display 814. It is contemplated that the components of system can be deployed in various configurations within other computer systems, e.g., host 826 and server 832.

FIG. 9 is a diagram of a chip set 900 that can be used to implement an embodiment. The chip set 900 is programmed to generate the environment-embedded code for facilitation of the digital transaction as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 902 for passing information among the components of the chip set 900. A processor 904 has connectivity to the bus 902 to execute instructions and process information stored in, for example, a memory 906. The processor 904 may include one or more processing cores with each core configured to perform independently. A multi-core processor enables multiprocessing within a single physical package. Examples of a multi-core processor include two, four, eight, or greater numbers of processing cores. Alternatively or in addition, the processor 904 may include one or more microprocessors configured in tandem via the bus 902 to enable independent execution of instructions, pipelining, and multithreading. The processor 904 may also be accompanied with one or more specialized components to perform certain processing functions and tasks such as one or more digital signal processors (DSP) 908, or one or more application-specific integrated circuits (ASIC) 910. A DSP 908 typically is configured to process physical-world signals (e.g., sound) in physical time independently of the processor 904. Similarly, an ASIC 910 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 904 and accompanying components have connectivity to the memory 906 via the bus 902. The memory 906 includes both dynamic memory (e.g., RAM, magnetic disk, writable optical disk, etc.) and static memory (e.g., ROM, CD-ROM, etc.) for storing executable instructions that when executed perform the inventive steps described herein to generate the environment-embedded code for facilitation of the digital transaction. The memory 906 also stores the data associated with or generated by the execution of the inventive steps.

Figure 10:
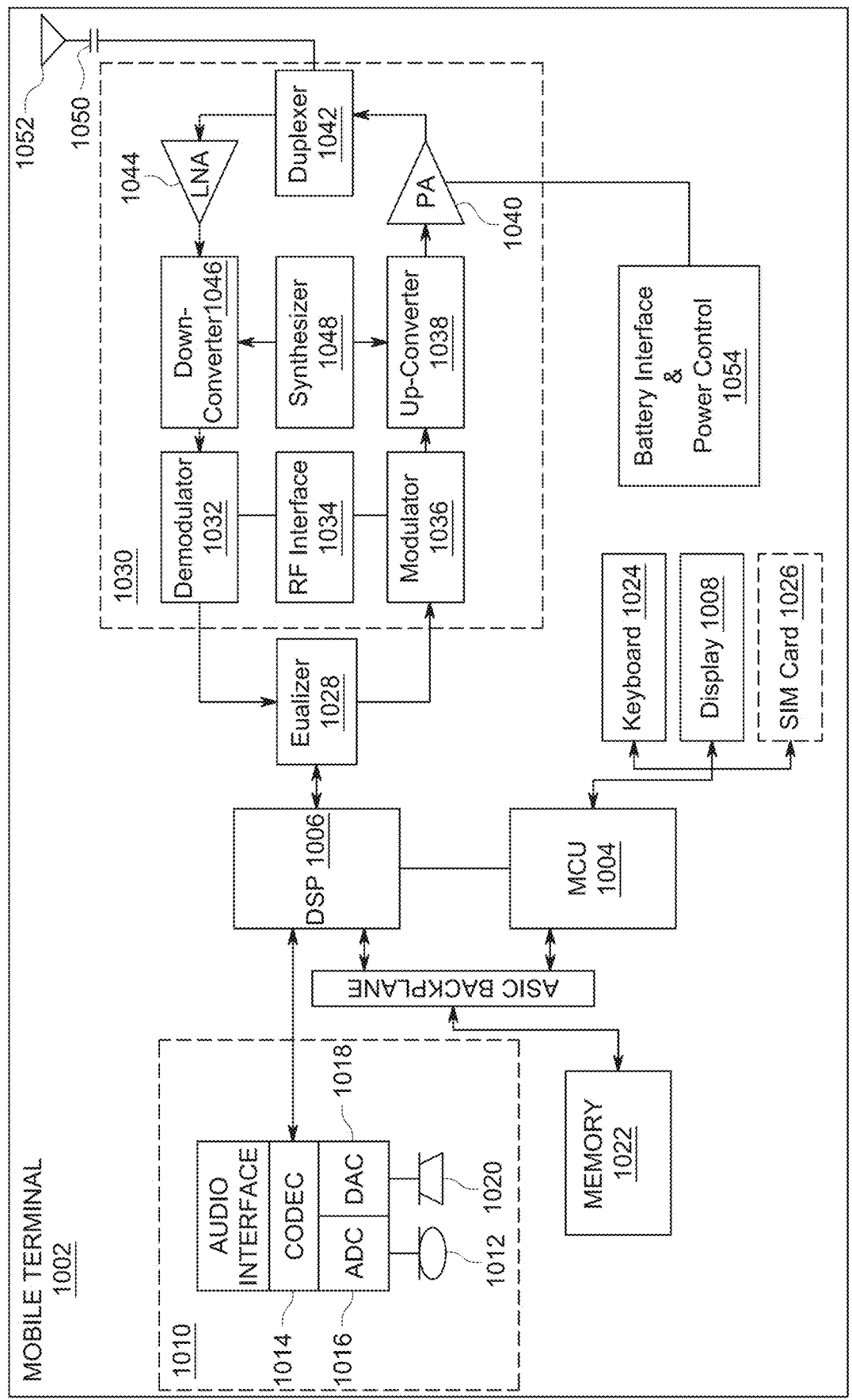
FIG. 10 is a diagram of a mobile terminal (e.g., handset, vehicle, or part thereof) that can be used to implement an embodiment.

FIG. 10 is a diagram of a mobile terminal 1002 (e.g., handset, vehicle, or part thereof) that can be used to implement an embodiment. Generally, a radio receiver is often defined in terms of front-end and back-end characteristics. The front-end of the receiver encompasses all of the Radio Frequency (RF) circuitry whereas the back end encompasses all of the base-band processing circuitry. Pertinent internal components of the telephone include a Main Control Unit (MCU) 1004, a Digital Signal Processor (DSP) 1006, and a receiver/transmitter unit including a microphone gain control unit and a speaker gain control unit. A main display unit 1008 provides a display to the user in support of various applications and mobile station functions that offer automatic contact matching. An audio function circuitry 1010 includes a microphone 1012 and microphone amplifier that amplifies the speech signal output from the microphone 1012. The amplified speech signal output from the microphone 1012 is fed to a coder/decoder (CODEC) 1014.

A radio section 1030 amplifies power and converts frequency in order to communicate with a base station, which is included in a mobile communication system, via antenna 1052. The power amplifier (PA) 1040 and the transmitter/modulation circuitry are operationally responsive to the MCU 1004, with an output from the PA 1040 coupled to the duplexer 1042 or circulator or antenna switch, as known in the art. The PA 1040 also couples to a battery interface and power control unit 1054.

In use, a user of mobile station 1002 speaks into the microphone 1012 and his or her voice along with any detected background noise is converted into an analog voltage. The analog voltage is then converted into a digital signal through the Analog to Digital Converter (ADC) 1016. The control unit 1004 routes the digital signal into the DSP 1006 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (Wi-Fi), satellite, and the like.

The encoded signals are then routed to an equalizer 1028 for compensation of any frequency-dependent impairments that occur during transmission though the air such as phase and amplitude distortion. After equalizing the bit stream, the modulator 1036 combines the signal with an RF signal generated in the RF interface 1034. The modulator 1036 generates a sine wave by way of frequency or phase modulation. In order to prepare the signal for transmission, an up-converter 1038 combines the sine wave output from the modulator 1036 with another sine wave generated by a synthesizer 1048 to achieve the desired frequency of transmission. The signal is then sent through a PA 1040 to increase the signal to an appropriate power level. In practical systems, the PA 1040 acts as a variable gain amplifier whose gain is controlled by the DSP 1006 from information received from a network base station. The signal is then filtered within the duplexer 1042 and optionally sent to an antenna coupler 1050 to match impedances to provide maximum power transfer. Finally, the signal is transmitted via antenna 1052 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1002 are received via antenna 1052 and immediately amplified by a low noise amplifier (LNA) 1044. A down-converter 1046 lowers the carrier frequency while the demodulator 1032 strips away the RF leaving only a digital bit stream. The signal then goes through the equalizer 1028 and is processed by the DSP 1006. A Digital to Analog Converter (DAC) 1018 converts the signal and the resulting output is transmitted to the user through the speaker 1020, all under control of a Main Control Unit (MCU) 1004—which can be implemented as a Central Processing Unit (CPU) (not shown).

The MCU 1004 receives various signals including input signals from the keyboard 1024. The keyboard 1024 and/or the MCU 1004 in combination with other user input components (e.g., the microphone 1012) comprise a user interface circuitry for managing user input. The MCU 1004 runs a user interface software to facilitate user control of at least some functions of the mobile station 1002 for generation of the environment-embedded code for facilitation of the digital transaction. The MCU 1004 also delivers a display command and a switch command to the display 1008 and to the speech output switching controller, respectively. Further, the MCU 1004 exchanges information with the DSP 1006 and can access an optionally incorporated SIM card 1026 and a memory 1022. In addition, the MCU 1004 executes various control functions required of the station. The DSP 1006 may, depending upon the implementation, perform any of a variety of conventional digital processing functions on the voice signals. Additionally, DSP 1006 determines the background noise level of the local environment from the signals detected by microphone 1012 and sets the gain of microphone 1012 to a level selected to compensate for the natural tendency of the user of the mobile station 1002.

The CODEC 1014 includes the ADC 1016 and DAC 1018. The memory 1022 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1022 may be, but not limited to, a single memory, CD, DVD, ROM, RAM, EEPROM, optical storage, or any other non-volatile or non-transitory storage medium capable of storing digital data.

An optionally incorporated SIM card 1026 carries, for instance, important information, such as the cellular phone number, the carrier supplying service, subscription details, and security information. The SIM card 1026 serves primarily to identify the mobile station 1002 on a radio network. The card 1026 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for facilitating a digital transaction comprising:
    scanning, using at least one sensor of a host device, a physical environment associated with a digital transaction location;
    generating a set of host anchors based on the scanning of the physical environment;
    computing a host anchor set geometry based on the generated set of host anchors, wherein the host anchor set geometry is based on anchor positions of the set of host anchors in an extended reality (XR) environment;
    determining an environment-embedded code based on the computed host anchor set geometry and the digital transaction location, wherein the environment-embedded code is unique to the host anchor set geometry and the digital transaction location; and
    storing the environment-embedded code, wherein the stored environment-embedded code is provided for facilitation of the digital transaction.

2. The method of claim 1, wherein the digital transaction is associated with a location smart contract.

3. The method of claim 2, wherein storing the environment-embedded code comprises:
    uploading the environment-embedded code to a blockchain managing the location smart contract.

4. The method of claim 1, wherein generating the set of host anchors further comprises:
    providing first scan data obtained from scanning the physical environment to an anchor service platform; and
    receiving the set of host anchors from the anchor service platform based on the provided first scan data.

5. The method of claim 1, wherein the host anchor set geometry is further computed based on distances between the anchor positions of the set of host anchors in the XR environment.

6. The method of claim 1, wherein the environment-embedded code is further based on the geographical coordinates of the digital transaction location, anchor identifiers (aIDs) of the set of host anchors, a time stamp associated with the determined environment-embedded code, authentication information associated with the host device, or a combination thereof.

7. The method of claim 6, wherein the environment-embedded code further comprises a validity time period.

8. The method of claim 1, further comprising:
    generating an environment-embedded code identifier (eeID) associated with the environment-embedded code; and
    storing the eeID along with the environment-embedded code, for facilitation of the digital transaction at the digital transaction location.

9. A system for facilitating a digital transaction comprising:
    at least one processor; and
    at least one memory including computer program code for one or more programs, the at least one memory and the computer program code configured to, with the at least one processor, cause the system to perform at least the following:
    receive a query associated with availability of an environment-embedded code at a digital transaction location of a scanned physical environment, from a resolver device present at the digital transaction location;
    provide a set of code information of the environment-embedded code to the resolver device based on the received query, wherein the resolver device is authenticated to receive the set of code information and, wherein the environment-embedded code is unique to a host anchor set geometry and the digital transaction location;
    receive a resolver anchor set geometry from the resolver device, wherein the resolver anchor set geometry is computed based on the set of code information of the environment-embedded code;
    generate a verification result associated with verification of the environment-embedded code based on computation of a similarity of a host anchor set geometry and the resolver anchor set geometry, wherein a set of host anchors are generated by a host device present at the digital transaction location at a prior time instance than a presence of the resolver device at the digital transaction location and wherein the host anchor set geometry is based on anchor positions of the set of host anchors in an extended reality (XR) environment; and
    provide for initiation of the digital transaction between the host device and the resolver device based on the generated verification result.

10. The system of claim 9, wherein the set of code information comprises at least one of: an environment-embedded code identifier (eeID) associated with the environment-embedded code, and an anchor identifier (aID) of the set of host anchors.

11. The system of claim 9, wherein the processor further causes the system to authenticate the presence of the resolver device at the digital transaction location to execute a smart contract associated with the digital transaction.

12. The system of claim 9, wherein the resolver device is configured to:

scan the physical environment;
provide second scan data obtained from scanning the physical environment to an anchor service platform; and
receive a set of resolver anchors from the anchor service platform in response to the provided second scan data.

13. The system of claim 9, wherein the resolver anchor set geometry is further computed based on distances between the anchor positions of the set of resolver anchors in the XR environment.

14. The system of claim 9, wherein the processor causes the system to compute the similarity of the host anchor set geometry and the resolver anchor set geometry based on a distance correlation metric.

15. The system of claim 14, wherein the generated verification result indicates a successful verification of the environment-embedded code based on a determination that one or more values in distance correlation metric is higher than or equal to a threshold value, and wherein
the processor causes the system to complete the initiated digital transaction based on the generated verification result that indicates the successful verification.

16. The system of claim 14, wherein the generated verification result indicates a failed verification of the environment-embedded code based on a determination that one or more values in the distance correlation metric is lower than a threshold value, and wherein the processor causes the system to prevent completion of the initiated digital transaction based on the generated verification result that indicates the failed verification.

17. The system of claim 9, wherein the processor further causes the system to generate a proof-of-location (POL) certificate for completion of the initiated digital transaction, based on a determination that the generated verification result indicates the successful verification of the environment-embedded code.

18. A computer program product for facilitating a digital transaction comprising at least one non-transitory computer-readable storage medium having computer-executable program code instructions stored therein, the computer-executable program code instructions comprising program code instructions to:
obtain, from a location validation service, an environment-embedded code corresponding to a digital transaction location, wherein the environment-embedded code is unique to a host anchor set geometry and the digital transaction location;
scan, using a sensor of a device, a physical environment at the digital transaction location where the device is present;
generate a set of resolver anchors in an extended reality (XR) environment based on the environment-embedded code;
compute a resolver anchor set geometry based on the set of resolver anchors; and
provide, to the location validation service, the resolver anchor set geometry to authorize the initiation of the digital transaction.

19. The computer program product of claim 18, wherein the resolver anchor set geometry is further computed based on: anchor positions of the set of resolver anchors in the XR environment, and distances between the anchor positions of the set of resolver anchors in the XR environment.

20. The computer program product of claim 18, the computer-executable program code instructions further comprising program code instructions to: obtain, from the location validation service, a Proof-of-Location (POL) certificate; and provide for execution of a smart contract based on the POL certificate.

\* \* \* \* \*